United States Patent
Zhao et al.

(10) Patent No.: US 12,442,183 B1
(45) Date of Patent: Oct. 14, 2025

(54) METHOD FOR DESIGN OF SEISMIC-DAMPING PARTITION WALL WITH VARIABLE FRICTION ENERGY DISSIPATION

(71) Applicant: SOUTH CHINA UNIVERSITY OF TECHNOLOGY, Guangzhou (CN)

(72) Inventors: Junxian Zhao, Guangzhou (CN); Hao Qin, Guangzhou (CN); Zhaoxun Yuan, Guangzhou (CN); Jinkun Wang, Guangzhou (CN)

(73) Assignee: SOUTH CHINA UNIVERSITY OF TECHNOLOGY, Guangzhou (CN)

( * ) Notice: Subject to any disclaimer, the term of this patent is extended or adjusted under 35 U.S.C. 154(b) by 0 days.

(21) Appl. No.: 19/192,359

(22) Filed: Apr. 29, 2025

Related U.S. Application Data

(63) Continuation of application No. PCT/CN2024/120570, filed on Sep. 24, 2024.

(30) Foreign Application Priority Data

Apr. 2, 2024 (CN) .......................... 202410395468.9

(51) Int. Cl.
*E04H 9/02* (2006.01)
*E04B 1/98* (2006.01)
(Continued)

(52) U.S. Cl.
CPC .................. *E04B 1/98* (2013.01); *E04B 2/74* (2013.01); *E04H 9/021* (2013.01); *E04C 2/30* (2013.01);
(Continued)

(58) Field of Classification Search
None
See application file for complete search history.

(56) References Cited

U.S. PATENT DOCUMENTS 1,394,550 A * 10/1921 Herbrick .................. E04C 2/06
52/274
3,638,377 A * 2/1972 Caspe ..................... E04H 9/023
52/167.6
(Continued)

FOREIGN PATENT DOCUMENTS

| CN | 102268900 | 12/2011 |
|----|-----------|---------|
| CN | 108442574 | 8/2018 |

(Continued)

OTHER PUBLICATIONS

"Office Action of China Counterpart Application", issued on Nov. 27, 2024, with English translation thereof, pp. 1-12.

(Continued)

*Primary Examiner* — Phi D A
(74) *Attorney, Agent, or Firm* — JCIPRNET

(57) ABSTRACT

The method for design of a seismic-damping partition wall with variable-friction-force energy dissipation provided by the present application includes the following steps: building a bare frame model without considering lateral resisting stiffness of a partition wall, and calculating an inter-story shear force and an inter-story displacement of a structure under action of an earthquake; calculating an elastic strain energy of the structure, and determining an expected additional damping ratio provided by a seismic-damping partition wall for the structure; determining a friction damping force-sliding displacement curve of a single group of seismic-damping partition wall panels, and establishing a relational expression between a total friction hysteretic energy and a friction damping force and a target sliding displacement of the single group of seismic-damping partition wall panels, and the seismic resilience of the partition wall and the structure can be synergistically improved.

14 Claims, 6 Drawing Sheets

(51) Int. Cl.
  *E04B 2/00* (2006.01)
  *E04B 2/74* (2006.01)
  *E04C 2/30* (2006.01)

(52) U.S. Cl.
  CPC .............. *E04C 2/44* (2013.01); *E04H 9/022* (2013.01); *E04H 9/028* (2013.01)

(56) References Cited

U.S. PATENT DOCUMENTS

| | | | | |
|---|---|---|---|---|
| 5,065,558 | A | * | 11/1991 | Boatsman ............ E04B 1/34315 52/848 |
| 5,303,524 | A | * | 4/1994 | Caspe ................... E04H 9/0237 52/167.2 |
| 12,123,218 | B1 | * | 10/2024 | Zhao ........................ E04H 9/021 |
| 12,188,256 | B1 | * | 1/2025 | Xiang ........................ E04B 1/98 |
| 12,252,898 | B2 | * | 3/2025 | Zhao .......................... E04H 9/02 |
| 2015/0135617 | A1 | * | 5/2015 | Liu ........................ E04B 2/7448 52/302.1 |
| 2016/0194867 | A1 | * | 7/2016 | Ahmadi ................. E04H 9/025 52/167.7 |
| 2020/0385982 | A1 | * | 12/2020 | Rivas ........................ E04B 5/02 |

FOREIGN PATENT DOCUMENTS

| | | | | |
|---|---|---|---|---|
| CN | 110593455 | | 12/2019 | |
| CN | 114575493 | | 6/2022 | |
| CN | 115680127 | | 2/2023 | |
| CN | 115718967 | | 2/2023 | |
| CN | 117248660 | | 12/2023 | |
| CN | 118332646 | | 7/2024 | |
| CN | 119021416 | A * | 11/2024 | ............. E04H 9/025 |
| JP | 2011252284 | | 12/2011 | |

OTHER PUBLICATIONS

"International Search Report (Form PCT/ISA/210) of PCT/CN2024/120570," mailed on Dec. 11, 2024, pp. 1-4.

"Written Opinion of the International Searching Authority (Form PCT/ISA/237) of PCT/CN2024/120570," mailed on Dec. 11, 2024, pp. 1-5.

* cited by examiner

METHOD FOR DESIGN OF SEISMIC-DAMPING PARTITION WALL WITH VARIABLE FRICTION ENERGY DISSIPATION

CROSS-REFERENCE TO RELATED APPLICATION

This application is a continuation of international PCT application serial no. PCT/CN2024/120570, filed on Sep. 24, 2024, which claims the priority benefit of China application no. 202410395468.9, filed on Apr. 2, 2024. The entirety of each of the above-mentioned patent applications is hereby incorporated by reference herein and made a part of this specification.

TECHNICAL FIELD

The present application relates to the technical field of seismic-damping of building structures, and in particular, to a method for design of a seismic-damping partition wall with variable friction energy dissipation.

RELATED ART

To meet requirements such as interior space separation and thermal insulation and sound insulation of buildings, a partition wall is widely applied to a building structure. In the design of a newly built building and the evaluation of an existing building, the partition wall is considered as a self-bearing non-structural member, and does not participate in the force bearing of a main body structure. However, the actual earthquake disaster phenomenon and the existing research results show that the partition wall and the surrounding main body structure cooperate to bear force, and the mutual restrictive effect is significant. Therefore, the partition wall in the building structure generally greatly improves the lateral resisting stiffness of the structure, thereby shortening the natural vibration period of the structure, increasing the seismic effect borne by the structure, and causing a serious damage to the partition wall itself, which brings difficulties and challenges for post-earthquake quick repair.

In the context of structural seismic resilience, the technical solution of a seismic-damping partition wall with a low damage characteristic emerges, and the main technical features thereof are as follows: on the one hand, a force transmission path between a partition wall and a surrounding structure is cut off by means of a flexible connection, releasing a restrictive effect and reducing wall body damage; on the other hand, the technology of energy dissipation and seismic damping is introduced to the partition wall by means of the inter-story deformation of the structure to achieve the partition wall with the function of dissipating seismic energy. As shown in FIGS. 1A, 1B and 1C, currently, a main implementation path of introducing the technology of energy dissipation and seismic damping to the partition wall includes arranging a seismic-damping layer (or energy dissipation unit) at a top (FIG. 1A), a middle (FIG. 1B) or a bottom (FIG. 1C) of the partition wall. The patent CN202310941227.5 discloses a technical solution where a seismic-damping layer is arranged at the bottom of a partition wall and the partition wall undergoes variable-friction sliding energy dissipation driven by the top, having at least the following advantages:

(1) Compared with the technical solution disclosed in CN201110156375.3 where a seismic-damping layer is arranged in the middle of a partition wall, by adopting the technical solution where a seismic-damping layer is arranged at the bottom of a partition wall and sliding energy dissipation occurs by the driving of the top, the sliding displacement of the partition wall can be maximally improved under the same inter-story displacement, thereby increasing the envelope area of the friction damping force-sliding displacement curve of the partition wall and increasing the accumulated energy dissipation capacity of the partition wall.

(2) The partition wall being provided with the seismic-damping layer generally means that the partition wall will slide and deform along the seismic-damping layer under the action of an earthquake, thus inevitably causing a sliding through crack on the wall surface of the partition wall body, and increasing the cost and time for post-earthquake repair of the building. The seismic-damping layer is arranged at the bottom of the partition wall, so that the sliding crack can be well controlled below the floor, thereby preventing the partition wall body from being significantly damaged, and after an earthquake, generally, the normal use state before the earthquake can be restored only by simply repairing the bottom of the partition wall.

(3) Patent CN202310941227.5 discloses a seismic-damping partition wall, the prominent technical feature and advantage thereof lie in that the sliding friction damping force can be improved along with the increase of seismic intensity, inter-story displacement and joint rotation angle, and therefore the seismic-damping partition wall has a certain self-adaptive energy dissipation function. It needs to be noted that the technical feature as described in advantage (3) has a higher energy dissipation level than the prior seismic-damping partition wall technical solution (e.g., energy dissipation by using a constant friction or a viscoelastic damping layer), and therefore a certain additional damping can be provided theoretically for the structure and the energy dissipation and seismic-damping capacity of the structure is increased.

Considering that the damping force provided by the seismic-damping partition wall in the solution of the prior art (such as patents CN201110156375.3, CN201810470671.2, CN201910901409.3, CN202210367123.3) is generally small, currently, the seismic-damping partition wall is more considered as a construction measure for improving the safety reserve of the structure and improving the seismic resilience of the partition wall, and the seismic-damping partition wall is rarely considered as a member that can provide additional damping for the structure, and there is no related design method matching the seismic-damping partition wall. However, compared with the prior solution, the technical solution where the seismic-damping layer is arranged at the bottom of the partition wall and the partition wall undergoes variable-friction sliding energy dissipation by the driving of the top, can provide relatively higher friction damping force and greater sliding displacement, and therefore, the design method of how to reasonably consider the influence of such a seismic-damping partition wall on the additional damping and anti-seismic design of the structure and parameterize the influence as the seismic-damping partition wall has important engineering significance and scientific value.

SUMMARY OF INVENTION

The present application aims to overcome the defects of the prior art, and provides a method for design of a seismic-damping partition wall with variable-friction energy dissipation. The method for design fully considers the influence of the seismic-damping partition wall on the additional damping and anti-seismic design of the structure, and meanwhile, associates key design parameters of the seismic-damping partition wall with the described influence, so that the seismic-damping partition wall can be subjected to parameterization design and adjustment according to the expected design target of the structure, thereby achieving the rule-based design of the seismic-damping partition wall, and synergistically improving the seismic resilience of the partition wall and the structure.

To achieve the objective of the present application, the method for design of a seismic-damping partition wall with variable-friction energy dissipation provided by the present application includes the following steps:

step 1: building a bare frame model without considering lateral resisting stiffness of partition walls (i.e., a bare frame does not include partition walls), and calculating an inter-story shear force and an inter-story displacement of a structure under action of an earthquake;

step 2: according to the inter-story shear force and the inter-story displacement obtained in step 1, calculating an elastic strain energy $W_e$ of the structure, and determining an expected additional damping ratio $\xi_{a0}$ provided by a seismic-damping partition wall in the structure for the structure;

step 3: according to a friction damping force-sliding displacement curve of a single group of seismic-damping partition wall panels, establishing a relational expression between a total friction hysteretic energy $W_d$ of the seismic-damping partition wall in the structure and friction damping forces $F_{Hu1}$ and $F_{Hu2}$ and a target sliding displacement $\Delta_H$ of the single group of seismic-damping partition wall panels, and calculating the total friction hysteretic energy $W_d$:

$$W_d = \sum W_{d,i} = \sum (2F_{H0,i} + F_{Hu1,i} + F_{Hu2,i})\Delta_{H,i}$$
$$F_{H0,i} = nF_{H0} \quad F_{Hu1,i} = nF_{Hu1} \quad F_{Hu2,i} = nF_{Hu2}$$

where $W_{d,i}$ is a total friction hysteretic energy of all the single groups of seismic-damping partition wall panels of an ith story of the structure; n is a number of all the single groups of seismic-damping partition wall panels (or seismic-damping partition wall groups) of the ith story; $\Delta_{H,i}$ is a target sliding displacement of a single group of seismic-damping partition wall panels of the ith story; $F_{H0,i}$ is a total sliding occurrence force of all the single groups of seismic-damping partition wall panels of the ith story; $F_{H0}$ is a sliding occurrence force of a single group of seismic-damping partition wall panels of the ith story, calculated according to a sliding friction coefficient and a gravity of the single group of seismic-damping partition wall panels; $F_{Hu1,i}$ is a sum of first friction damping forces of all the single groups of seismic-damping partition wall panels of the ith story; $F_{Hu1}$ is a first friction damping force of a corresponding single group of seismic-damping partition wall panels; $F_{Hu2,i}$ is a sum of second friction damping forces of all the single groups of seismic-damping partition wall panels of the ith story; and $F_{Hu2}$ is a second friction damping force of a corresponding single group of seismic-damping partition wall panels;

step 4: solving a calculated additional damping ratio $\xi_a$ provided by the seismic-damping partition wall for the structure, and subjecting the calculated additional damping ratio $\xi_a$ and the expected additional damping ratio $\xi_{a0}$ to simultaneous comparison; if an expected design target is satisfied, i.e., $\xi_a \geq \xi_{a0}$, determining the first friction damping force $F_{Hu1}$ and the second friction damping force $F_{Hu2}$ of the single group of seismic-damping partition wall panels; otherwise, continuing to adjust until the expected design target is satisfied, wherein the calculated additional damping ratio $\xi_a$ is solved with reference to the following formula:

$$\xi_a = \frac{W_d}{4\pi W_e} \geq \xi_a 0$$

step 5: according to vertical compression requirements and elastic deformation requirements of the elastic members in the single group of seismic-damping partition wall panels, designing construction of the elastic members, wherein an actual vertical stiffness design value $K_{B,d}$ and an elastic deformation requirement $\Delta_y$ of the elastic members need to simultaneously satisfy the following formulas:

$$K_{B,d} = \gamma K_B = \gamma \frac{F_B}{\varphi L_B \lambda}$$
$$\Delta_y \geq \varphi L_B \lambda$$

where $\gamma$ is a design tolerance; $K_B$ is a theoretical required vertical stiffness value of the elastic members; $F_B$ is a vertical compression of the elastic members against the seismic-damping partition wall, basic requirements being determined by step 4; $\varphi$ is an inter-story displacement ratio of the peripheral frame where the single group of seismic-damping partition wall panels is located; $L_B$ is a vertical distance from a down-press point of the elastic members to a central line of a column section; and $\lambda$ is a coefficient of variation between a rigid body frame deformation mechanism and an actual frame deformation mechanism;

step 6: according to the first friction damping force $F_{Hu1}$ of the single group of seismic-damping partition wall panels, calculating an anti-shear bearing force $V_s$ at a connection between the anti-shear connecting members, and designing a form and construction of connection between the anti-shear connecting members;

step 7: performing damage control check on concrete wall panels near the lower encased reinforcing boxes of the single group of seismic-damping partition wall panels; and step 8: completing the design of the seismic-damping partition wall with variable-friction energy dissipation.

Further, methods for calculation of the inter-story shear force and the inter-story displacement in step 1 include, but are not limited to, a bottom shear method, a time history analysis method, a pushover method, etc.

Further, the elastic strain energy of the structure in step 2 can be subjected to simplified calculation according to the following formula:

$$W_e = \sum W_{e,i} = \frac{1}{2}\sum Q_i \Delta_i$$

where $W_{e,i}$ is an elastic strain energy of the 4 th story of the structure; $Q_i$ is an inter-story shear force of the ith story of the structure; and $\Delta_i$ is an inter-story displacement of the ith story of the structure.

Further, in step 2, considering that the partition wall is one of the members having the largest number and the widest distribution in a house building, the requirements for friction damping force provided by the single group of seismic-damping partition wall panels need not to be too high, and the seismic-damping partition wall needs to be arranged uniformly and widely in the structure to achieve the expected energy dissipation and seismic-damping target.

Further, the expected additional damping ratio $\xi_{a0}$ provided by the seismic-damping partition wall for the structure in step 2 can be determined according to the inter-story displacement ratio of the structure.

Further, the friction damping force-sliding displacement curve of the single group of seismic-damping partition wall panels in step 3 is shown in FIG. 2, where abscissas represent a sliding displacement $\Delta_w$ of the single group of seismic-damping partition wall panels, and ordinates represent a friction damping force $F_H$ of the single group of seismic-damping partition wall panels.

Further, the friction damping force-sliding displacement curve can be determined by means of 7 feature points in sequential end-to-end closure connection, including point 0 and point a to point f; the point 0 is coordinate point 0; the point a is a feature point when the single group of seismic-damping partition wall panels slides just after overcoming a maximum static friction force, and corresponding coordinates are $(0, F_{H0})$, where $F_{H0}$ is a sliding occurrence force of the single group of seismic-damping partition wall panels; point b is a feature point where the single group of seismic-damping partition wall panels slides from the point a to a positive target sliding displacement $\Delta_H$, and corresponding coordinates are $(\Delta_H, F_{Hu1})$, where $F_{Hu1}$ is a friction damping force of the single group of seismic-damping partition wall panels in this state; point c is a feature point where the single group of seismic-damping partition wall panels just changes when sliding back from a positive target sliding displacement $\Delta_H$ point to the point 0, and at this moment, it is considered that a sliding displacement of the partition wall remains unchanged (i.e., $\Delta_w = \Delta_H$), but a direction and a magnitude of the friction damping force change, and corresponding coordinates are $(\Delta_H, -F_{Hu2})$, where $-F_{Hu2}$ is a friction damping force of the single group of seismic-damping partition wall panels in this state; point d is a feature point where the single group of seismic-damping partition wall panels slides back from the point c to the point 0, and corresponding coordinates are $(0, -F_{H0})$, where $-F_{H0}$ is a friction damping force of the single group of seismic-damping partition wall panels in this state; point e is a feature point where the single group of seismic-damping partition wall panels slides from the point d to a negative target sliding displacement $-\Delta_H$ (similar to the feature point b, which is not described herein again), and corresponding coordinates are $(-\Delta_H, -F_{Hu1})$, where $-F_{Hu1}$ is a friction damping force of the single group of seismic-damping partition wall panels in this state; the point f is a feature point where the single group of seismic-damping partition wall panels just changes when sliding back from a negative target sliding displacement $-\Delta_H$ point to the point 0 (similar to the feature point c, which is not described herein again), and corresponding coordinates are $(-\Delta_H, F_{Hu2})$, where $F_{Hu2}$ is a friction damping force of the single group of seismic-damping partition wall panels in this state.

Further, the $F_{Hu1}$ and the $F_{Hu2}$ can be defined as a first friction damping force and a second friction damping force of the single group of seismic-damping partition wall panels, respectively.

Further, based on an assumption that the peripheral frame of the single group of seismic-damping partition wall panels is a rigid body deformation, for the methods for calculation of the first friction damping force $F_{Hu1}$ and the second friction damping force $F_{Hu2}$, reference is made to the following formulas:

$$F_{Hu1} = \frac{\kappa}{1 - \kappa\mu_{2S}}(F_B + G_w)$$

$$F_{Hu2} = \frac{\kappa'}{1 - \kappa'\mu_{2S}}(F_B + G_w)$$

$$\kappa = \mu_{1S}\eta_1 + \mu_{1S}\eta_2 + \mu_{1C}\eta_3$$

$$\kappa' = \mu_{1S}\eta'_1 + \mu_{1S}\eta'_2 + \mu_{1C}\eta'_3$$

where $F_B$ is a vertical compression of the elastic members against the single group of seismic-damping partition wall panels; $G_w$ is a total gravity of the single group of seismic-damping partition wall panels; $\mu_{1S}$ and $\mu_{1C}$ are a coefficient of friction between the lower encased reinforcing boxes in the single group of seismic-damping partition wall panels and the partial backing plates, and a coefficient of friction between concrete-friction seismic-damping layers, respectively; $\mu_{2S}$ is a coefficient of friction between a top sliding driving point of the single group of seismic-damping partition wall panels and a horizontal force transmission member; $\eta_1$ and $\eta_2$ are coefficients of distribution of normal compressions at two corners of a bottom surface of the partition wall when the single group of seismic-damping partition wall panels slides from the point 0 to a positive (or negative) target sliding displacement; $\eta_3$ is a coefficient of distribution of a normal compression in a middle of the bottom surface of the partition wall when the single group of seismic-damping partition wall panels slides from the point 0 to the positive (or negative) target sliding displacement; $\eta'_1$ and $\eta'_2$ are coefficients of distribution of normal compressions at the two corners of the bottom surface of the partition wall when the single group of seismic-damping partition wall panels slides back from the positive (or negative) target sliding displacement to the point 0; $\eta'_3$ is a coefficient of distribution of a normal compression in the middle of the bottom surface of the partition wall when the single group of seismic-damping partition wall panels slides back from the positive (or negative) target sliding displacement to the point 0; $\kappa$ is a coefficient of calculation of the first friction damping force; and $\kappa'$ is a coefficient of calculation of the second friction damping force.

Further, the calculation of the first friction damping force $F_{Hu1}$ and the second friction damping force $F_{Hu2}$ of the single group of seismic-damping partition wall panels in step 4 need to be adjusted according to requirements; it needs to be noted that the inter-story shear force and the inter-story displacement in step 2 are obtained by solving based on the bare frame model without considering the contribution of the lateral resisting force of the seismic-damping partition wall, thus in step 4, according to actual engineering requirements, after the first friction damping force of each story of seismic-damping partition wall may be superimposed to the corresponding structural inter-story shear force, the relationship between the calculated additional damping ratio (which, at this moment, may be referred to as a corrected calculated additional damping ratio $\xi'_a$) and the expected additional damping ratio $\xi_{a0}$ is rechecked, and if the requirements are still satisfied, the next step continues; otherwise step 1 to step 4 are repeated until the expected design target is satisfied;

Further, for the design of the elastic members in step 5, the theoretical required vertical stiffness value of the elastic members needs to be determined according to the friction damping forces of the single group of seismic-damping partition wall panels, and it needs to be ensured that the requirement for elastic deformation of the elastic members is not less than the maximum down-press deformation of the elastic members;

Further, the anti-shear bearing force $V_s$ at the connection of the anti-shear connecting members in step 6 is proposed based on a control target in which the partition wall panels in the single group of seismic-damping partition wall panels do not rock and a relative sliding deformation does not occur between the partition wall panels, and the anti-shear bearing force $V_s$ needs to satisfy $$V_s \geq \psi V$$

$$V = \frac{F_{Hu1}(h_w - \mu_{2S} b_w) - F_B x - G_{w1} b_w/2}{\mu_{1C} \beta h_1} - (G_w - G_{w1})$$

where $\psi$ is a coefficient of adjustment of a shear force at a connection between single anti-shear connecting members; V is a maximum critical shear force (effect) expected to be borne by the connection between the anti-shear connecting members; $h_w$ is a distance from a bottom surface of the single group of seismic-damping partition wall panels to a top sliding driving point; $\mu_{2S}$ is a coefficient of friction between the top sliding driving point of the single group of seismic-damping partition wall panels and a horizontal force transmission member; $b_w$ is a width of a single partition wall panel in the single group of seismic-damping partition wall panels; $F_B$ is a vertical compression of the elastic members against the single group of seismic-damping partition wall panels; x is a distance from an acting point of a concentrated load of the elastic members to a right edge of a first partition wall panel; $G_{w1}$ is a gravity of the first partition wall panel in the single group of seismic-damping partition wall panels; $G_w$ is a total gravity of the single group of seismic-damping partition wall panels; $\mu_{1C}$ is a coefficient of friction between concrete-friction seismic-damping layers; $\beta$ is a safety reserve factor; and $h_1$ is a distance from an acting point of a horizontal resistance force borne by the first partition wall panel to a bottom surface of the first partition wall panel;

Further, a method for damage control check of the seismic-damping partition wall in step 7 is proposed on a premise that concrete in encased reinforcing boxes at corners of the seismic-damping partition wall is not broken prior to concrete outside the encased reinforcing boxes, and for the method for check, reference is made to the following formula:

$$\sigma_c \leq [\alpha f_c]$$

$$\sigma_c = \frac{\mu_{2S} F_{Hu1} + F_B + G_w}{\omega A_c}$$

where $\sigma_c$ is a compressive stress of concrete near the lower encased reinforcing boxes of the single group of seismic-damping partition wall panels; $\alpha$ is a safety factor when the damage control check is performed on the concrete wall panels; $f_c$ is an axial compressive strength of a concrete material in the single group of seismic-damping partition wall panels; $\mu_{2S}$ is a coefficient of friction between a top sliding driving point of the single group of seismic-damping partition wall panels and a horizontal force transmission member; $F_{Hu1}$ is a first friction damping force of the single group of seismic-damping partition wall panels; $\omega$ is an area reduction factor when the damage control check is performed on the concrete wall panels (i.e., seismic-damping partition wall); $A_c$ is a projection area of the lower encased reinforcing boxes of the seismic-damping partition wall; $F_B$ is vertical compression of the elastic members against the single group of seismic-damping partition wall panels; and $G_w$ is a total gravity of the single group of seismic-damping partition wall panels.

Compared with the solution of the prior art, the method for design of the seismic-damping partition wall with variable-friction energy dissipation provided by the present application will further improve and enrich the technical system of the seismic-damping partition wall with such technical features, provides a certain reference and technical support for the design method and engineering promotion of the seismic-damping partition wall, and can at least achieve the following beneficial effects:

1. Specify the Working Mechanism of the Variable-Friction Seismic-Damping Partition Wall Compared with the solution of the prior art, the present application clarifies the force-bearing characteristic of the seismic-damping partition wall with variable-friction energy dissipation, proposes a typical restoring force curve (i.e., the friction damping force-sliding displacement curve, with reference to FIG. 2) of the seismic-damping partition wall with variable-friction energy dissipation, establishes the method for calculation and prediction of the typical restoring force curve, and specifies the working mechanism and energy dissipation mechanism of such a seismic-damping partition wall, so that the damage control capability and the additional power dissipation level of the seismic-damping partition wall can be synergistically improved, thereby providing a reference for parametrization design of the seismic-damping partition wall with variable-friction energy dissipation.

2. Synergistically Improve the Seismic Resilience of the Partition Wall and the Structure Compared with the solution of the prior art, the seismic-damping partition wall with variable-friction energy dissipation can provide higher damping forces and greater relative sliding displacement, therefore, the method for design of the seismic-damping partition wall with variable-friction energy dissipation provided by the present application considers the influence of such a seismic-damping partition wall on the additional damping and anti-seismic design of the structure; by establishing the relationship between the components such as the elastic members and the anti-shear connecting members of the seismic-damping partition wall and the additional damping of the structure, the seismic-damping partition wall can be designed and adjusted according to the design target of the structure, thereby achieving the seismic-damping partition wall and the rule-based design of the structure with the seismic-damping partition wall, and synergistically improving the seismic resilience of the partition wall and the structure.

where 1-Peripheral frame, 11-Left frame column, 12-Right frame column, 13-Upper frame beam, 14-Lower frame beam, 2-Single group of seismic-damping partition wall panels, 21-First partition wall panel, 22-Second partition wall panel, 23-Third partition wall panel, 24-Fourth partition wall panel, 25-Fifth partition wall panel, 26-Sixth partition wall panel, 3-Anti-shear connecting member, 4-Lower encased reinforcing box, 5-Upper encased reinforcing box, 6-Elastic member, 61-Steel simply-supported beam, 62-Support pier, 63-Load allocation beam, 64-Buttonhead bolt, 65-Disc washer, 66-Positioning bolt, 7-Horizontal force transmission member, 8-Partial backing plate, 9-Friction seismic-damping layer, 101-Seismic-damping layer (or energy dissipation unit), 102-Top sliding driving point.

DESCRIPTION OF EMBODIMENTS

It needs to be noted that the following detailed description is exemplary, and is intended to provide further description of the present application, and thus cannot be construed to limit the present application.

Embodiment 1

Based on a seismic-damping partition wall with variable-friction energy dissipation, an embodiment of the present application proposes a method for parametrization design of such a seismic-damping partition wall by considering an influence of the seismic-damping partition wall on an additional damping and anti-seismic design of a structure. Further, main technical features of such a seismic-damping partition wall lie in that a seismic-damping layer is arranged at a bottom of the partition wall and the partition wall undergoes variable-friction sliding energy dissipation by the driving of the top sliding driving point. The construction of the seismic-damping partition wall is firstly introduced for details.

Figure 3:
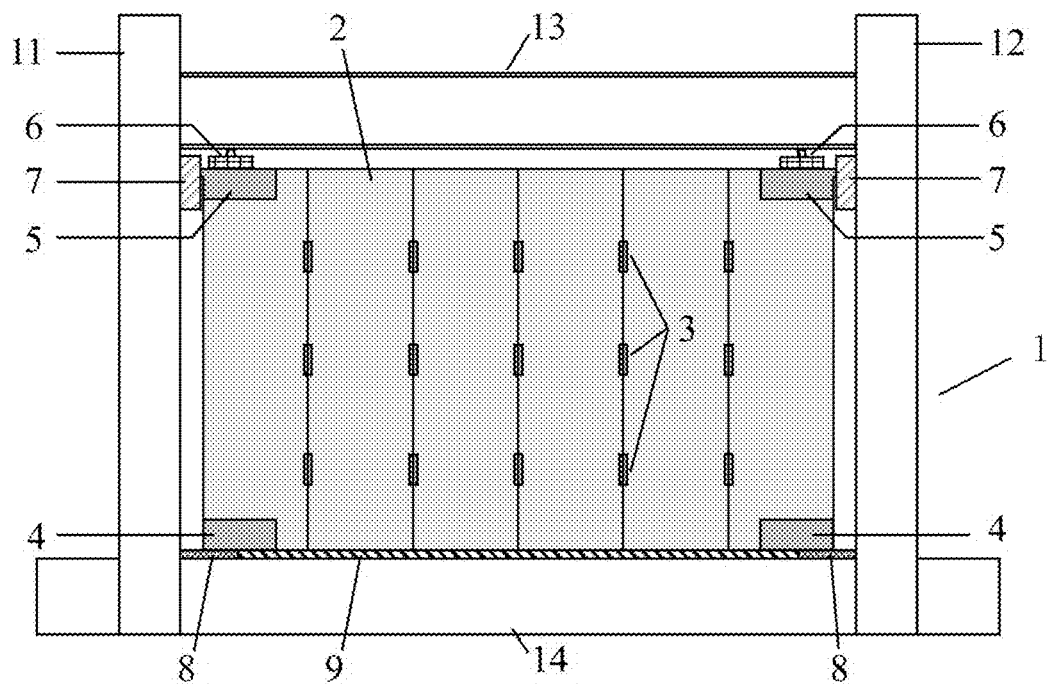
FIG. 3 is a schematic diagram of a typical construction form of a seismic-damping partition wall with variable-friction energy dissipation provided by embodiment 1.

A typical embodiment construction of the seismic-damping partition wall with variable-friction energy dissipation is shown in FIG. 3. The seismic-damping partition wall includes a peripheral frame 1, a single group of seismic-damping partition wall panels 2, anti-shear connecting members 3, lower encased reinforcing boxes 4, upper encased reinforcing boxes 5, elastic members 6, horizontal force transmission members 7, partial backing plates 8, and a friction seismic-damping layer 9. The peripheral frame includes a left frame column 11, a right frame column 12, an upper frame beam 13, and a lower frame beam 14, and left ends and right ends of the upper frame beam 13 and the lower frame beam 14 are in rigid connection with the left frame column 11 and the right frame column 12, respectively. The single group of seismic-damping partition wall panels 2 includes, in sequence from left to right, a first partition wall panel 21, a second partition wall panel 22, a third partition wall panel 23, a fourth partition wall panel 24, a fifth partition wall panel 25, a sixth partition wall panel 26. A plurality of the anti-shear connecting members 3 are arranged uniformly along a side height of each partition wall panel (e.g., 3 anti-shear connecting members may be arranged) to achieve reliable splicing between different partition wall panel, and specifically, two anti-shear connecting members 3 are in butt connection with each other and then welded so that reliable connection can be achieved. The lower encased reinforcing boxes 4 are two in total and located at a lower left corner and a lower right corner of the single group of seismic-damping partition wall panels 2, respectively. The upper encased reinforcing boxes 5 are two in total and located at an upper left corner and an upper right corner of the single group of seismic-damping partition wall panels 2, respectively, wherein one top sliding driving point 103 protruding in part is arranged on a side surface of the upper encased reinforcing box 5, both the lower encased reinforcing boxes 4 and the upper encased reinforcing boxes 5 are steel boxes, and the partial backing plates 8 are steel plates. The elastic members 6 are two in total and located between the upper encased reinforcing boxes 5 and the upper frame beam 13, wherein the elastic members 6 are in reliable connection with the upper encased reinforcing boxes 5 and are in normal hard contact with the upper frame beam 13 without tangential friction. A specific construction form of the elastic members 6 includes a compressive rubber pad or a compressive steel component, and when the construction of the compressive steel component provided by this embodiment 1 is adopted, please refer to FIGS. 7A and 7B, the elastic member 6 includes a steel simply-supported beam 61, support piers 62, a load distribution beam 63, a button-head bolt 64, disc washers 65, and positioning bolts 66, the two support piers 62 are located at two ends of one side of the steel simply-supported beam 61, respectively, and the load allocation beam 63 is located in a middle of the other side of the steel simply-supported beam 61. The horizontal force transmission members 7 are two in total and located between the top sliding driving point 103 on the side surface of the upper encased reinforcing box 5 and the left frame column 11 and between the single group of seismic-damping partition wall panels 2 and the right frame column 12, respectively, wherein one side of the two horizontal force transmission members 7 is in reliable connection with the left frame column 11 and the right frame column 12, respectively, and are in normal hard contact and tangential friction contact with the top sliding driving point 103 on the side surface of the upper encased reinforcing box 5. The partial backing plates 8 are two in total, located at a lower left corner and lower right corner of the single group of seismic-damping partition wall panels 2, respectively, and are in normal hard contact and tangential friction contact with the single group of seismic-damping partition wall panels 2. The friction seismic-damping layer 9 is located at a top of the lower frame beam 14, and a bottom of the friction seismic-damping layer 9 is in reliable connection with the top of the lower frame beam 14 and is in normal hard contact and tangential friction contact with a bottom surface of the single group of seismic-damping partition wall panels 2 and the two lower encased reinforcing boxes 4.

The lower encased reinforcing boxes 4, the upper encased reinforcing boxes 5, and the partial backing plates 8 are all made of steel.

Embodiment 2

Based on embodiment 1, this embodiment provides a method for design of a seismic-damping partition wall with variable-friction energy dissipation.

Figure 4:
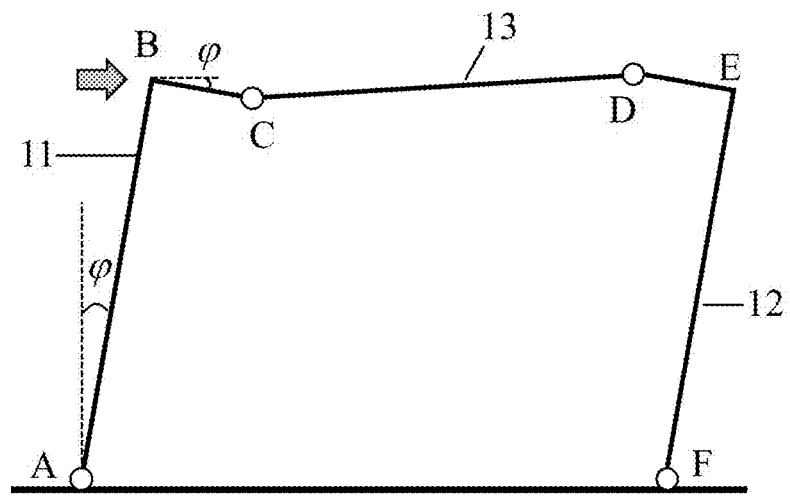
FIG. 4 is a schematic diagram of a peripheral frame of a seismic-damping partition wall as a rigid body deformation provided by embodiment 1.

To facilitate understanding of the working mechanism, energy dissipation principle and design method of the seismic-damping partition wall with variable-friction energy dissipation, the present application adopts the following assumption and analysis method:

(1) The peripheral frame is equivalent to a "rigid body+rotating hinge" model, as shown in FIG. 4; a left frame column 11 in FIG. 3 is equivalent to an AB-section rigid body in FIG. 4; a left end range of the upper frame beam 13 in FIG. 3 (a length range of extending rightward from an interface between the left frame column 11 and the upper frame beam 13 by the height of one beam) is equivalent to a BC-section rigid body in FIG. 4; a right end range of the upper frame beam 13 in FIG. 3 (a length range of extending leftward from an interface between the right frame column 12 and the upper frame beam 13 by the height of one beam) is equivalent to a DE-section rigid body in FIG. 4; a beam section after a left end range length and a right end range length are subtracted from the total length of the upper frame beam 13 in FIG. 3 is a middle beam section, which is equivalent to a CD-section rigid body in FIG. 4; the right frame column 12 in FIG. 3 is equivalent to an EF-section rigid body in FIG. 4; rotating hinges are located at column feet (respectively corresponding to point A and point F in FIG. 4) of the left frame column 11 and the right frame column 12, and at an interface between an end range and the middle beam section (respectively corresponding to point C and point D in FIG. 4).

(2) Under the horizontal seismic action, the peripheral frame subjected to be equivalent to the "rigid body+rotating hinge" model only undergoes a rigid body deformation, and the peripheral frame undergoes inter-story deformation under an earthquake by using point A and point F as fixed rotation points (no translation, only rotation) and using point C and point D as movable rotation points (undergoing translation and rotation).

Figure 5:
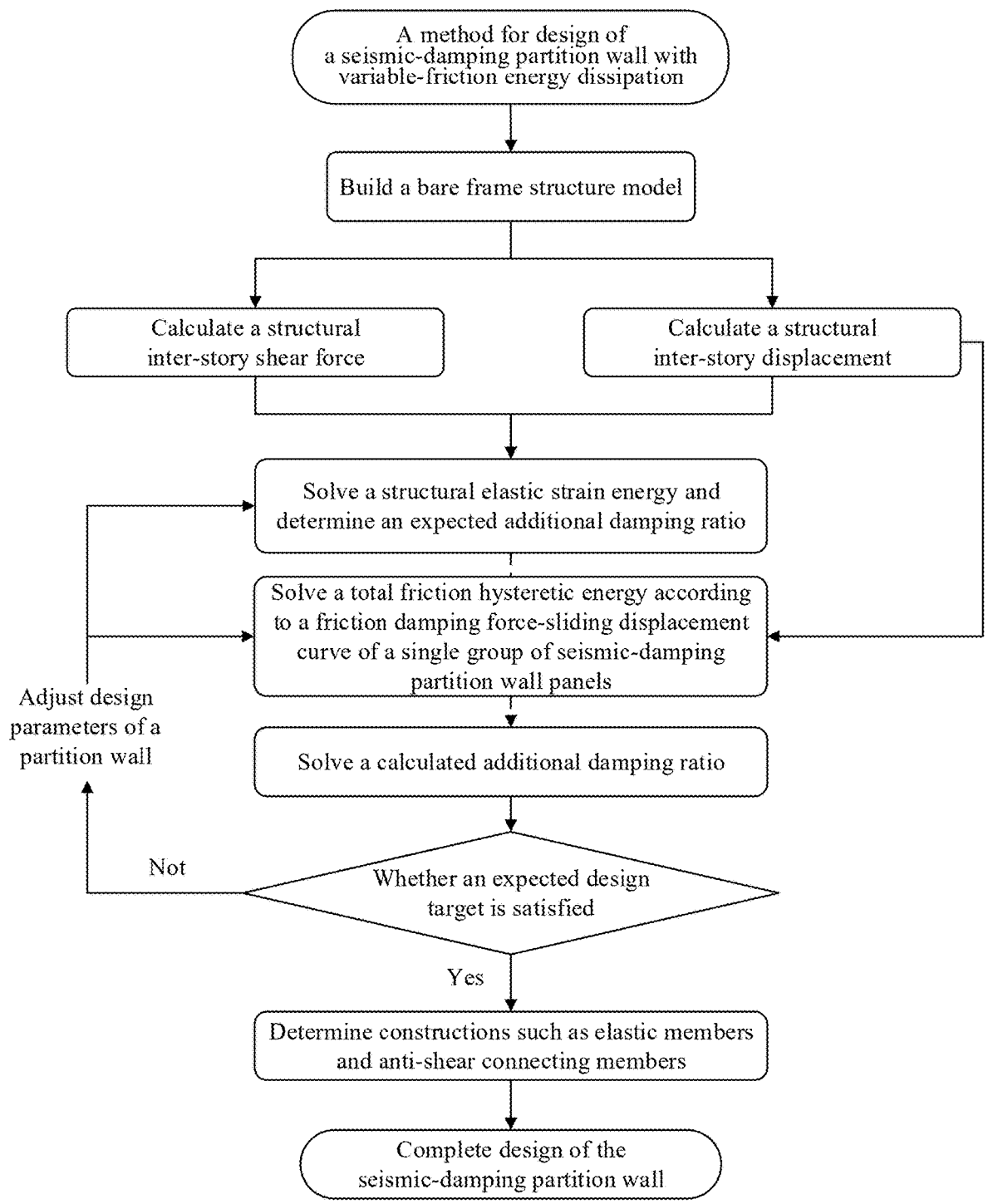
FIG. 5 is a schematic flow diagram of a method for design of a seismic-damping partition wall with variable-friction energy dissipation provided by embodiment 2.

Further, the flow of the method for design of the seismic-damping partition wall with variable-friction energy dissipation provided by the present application is shown in FIG. 5, now described as follows:

Step 1: building a bare frame structure model without a seismic-damping partition wall, and calculating and extracting an inter-story shear force and an inter-story displacement of a structure under action of an earthquake.

In this step, considering that the single group of seismic-damping partition wall panels 2 belongs to a self-bearing non-structural member and the interaction between the single group of seismic-damping partition wall panels and the peripheral frame is significantly reduced, the seismic-damping partition wall may not be modeled in the model when preliminary design parameters of the single group of seismic-damping partition wall panels 2 are determined. In some embodiments of the present application, methods for calculation of the inter-story shear force and the inter-story displacement are consistent with current design methods, and the inter-story shear force and the inter-story displacement can be solved and calculated according to engineering requirements by using a bottom shear method, a time history analysis method, a pushover method, etc.

Step 2: according to the inter-story shear force and the inter-story displacement solved in step 1, calculating an elastic strain energy $W_e$ of the structure, and according to actual engineering requirements, determining an expected additional damping ratio $\xi_{a0}$ provided by a seismic-damping partition wall for the structure.

In this step, considering that the partition wall is one of the members having the largest number and the widest distribution in a house building, the requirements for friction damping force provided by the single group of seismic-damping partition wall panels 2 need not to be too high, and the single group of seismic-damping partition wall panels 2 needs to be arranged uniformly and widely in the structure to achieve the energy dissipation and seismic-damping target.

Further, the elastic strain energy $W_e$ of the structure in step 2 can be subjected to simplified calculation according to the following formula:

$$W_e = \sum W_{e,i} = \frac{1}{2}\sum Q_i \Delta_i$$

where $W_{e,i}$ is an elastic strain energy of the ith story of the structure; $Q_i$ is an inter-story shear force of the ith story of the structure; and $\Delta_i$ is an inter-story displacement of the ith story of the structure.

The expected additional damping ratio provided by the seismic-damping partition wall for the structure can be set according to the inter-story displacement of the structure. For example, in some embodiments of the present application, according to the inter-story displacement ratio ($\varphi$) of the structure when reaching 2% of an elastoplastic limit value, the expected additional damping ratio $\xi_{a0} \approx 2\%$ provided by the seismic-damping partition wall for the structure can be designed.

Step 3: according to a friction damping force-sliding displacement curve of a single group of seismic-damping partition wall panels, establishing a relational expression between a total friction hysteretic energy $W_d$ of the seismic-damping partition wall in the structure and a first friction damping force $F_{Hu1}$ and a second friction damping force $F_{Hu2}$ and a target sliding displacement $\Delta_H$ of the single group of seismic-damping partition wall panels, and calculating the total friction hysteretic energy $W_d$.

In some embodiments of the present application, step 3 specifically includes the following substeps:

Step 3.1: drawing the friction damping force-sliding displacement curve of the single group of seismic-damping partition wall panels.

Figures 1A, 1B, 1C:
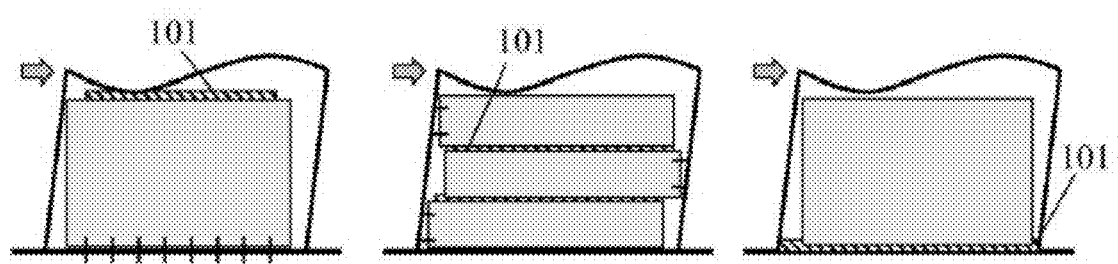
FIG. 1A is a schematic diagram for improving resilience of a partition wall by arranging a seismic-damping layer (or energy dissipation unit) at a top of the partition wall in a solution of the prior art.
FIG. 1B is a schematic diagram for improving resilience of a partition wall by arranging a seismic-damping layer (or energy dissipation unit) in a middle of the partition wall in a solution of the prior art.
FIG. 1C is a schematic diagram for improving resilience of a partition wall by arranging a seismic-damping layer (or energy dissipation unit) at a bottom of the partition wall in a solution of the prior art.
Figure 2:
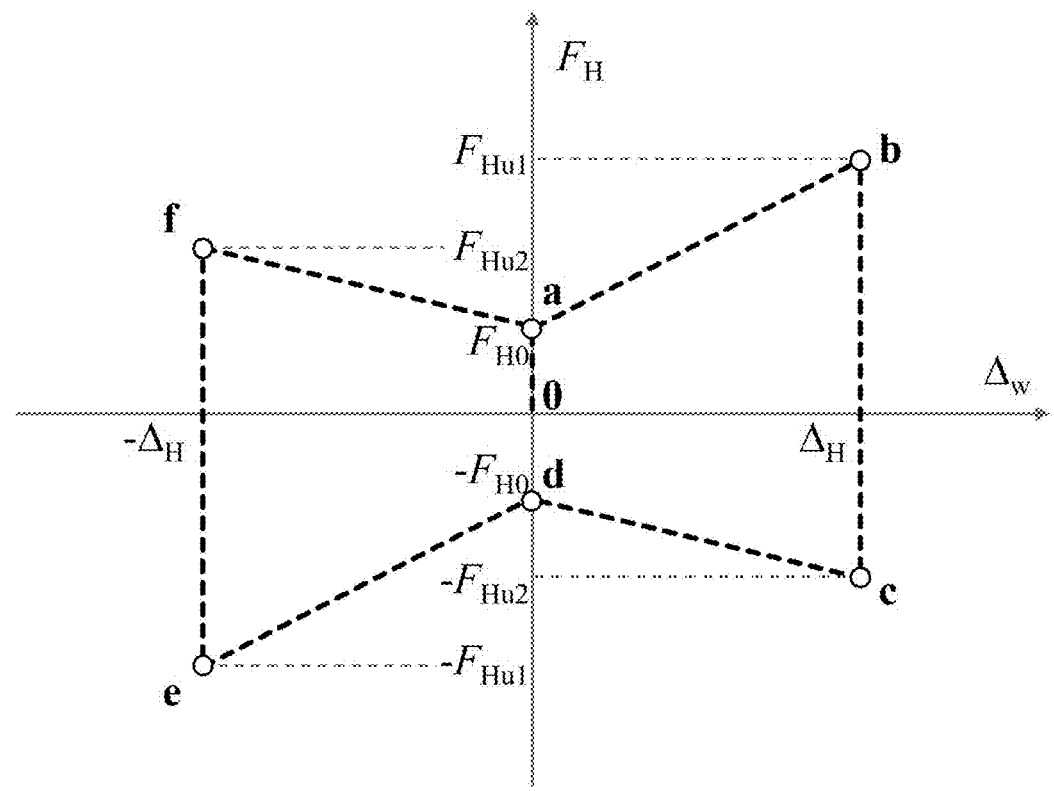
FIG. 2 is a diagram of a typical friction damping force-sliding displacement curve of a seismic-damping partition wall with variable-friction energy dissipation provided by the present application.

In some embodiments of the present application, the friction damping force-sliding displacement curve is shown in FIG. 2, where abscissas represent a sliding displacement $\Delta_w$ of the single group of seismic-damping partition wall panels, and ordinates represent a friction damping force $F_H$ of the single group of seismic-damping partition wall panels;

Further, the friction damping force-sliding displacement curve can be determined by means of 7 feature points in sequential end-to-end closure connection, including point 0 and point a to point f; the point 0 is coordinate point 0; the point a is a feature point when the single group of seismic-damping partition wall panels 2 slides just after overcoming a maximum static friction, and corresponding coordinates are (0, $F_{H0}$), where $F_{H0}$ is a sliding force of the single group of seismic-damping partition wall panels 2; point b is a feature point where the single group of seismic-damping partition wall panels 2 slides from the point a to a positive target sliding displacement $\Delta_H$, and corresponding coordinates are ($\Delta_H$, $F_{Hu1}$), where $F_{Hu1}$ is a friction damping force of the single group of seismic-damping partition wall panels 2 in this state; point c is a feature point where the single group of seismic-damping partition wall panels 2 just changes when sliding back from a positive target sliding displacement $\Delta_H$ point to the point 0, and at this moment, it is considered that a sliding displacement of the partition wall remains unchanged (i.e., $\Delta_w = \Delta_H$), but a direction and a magnitude of the friction damping force change, and corresponding coordinates are ($\Delta_H$, $-F_{Hu2}$), where $-F_{Hu2}$ is a friction damping force of the single group of seismic-damping partition wall panels 2 in this state; point d is a feature point where the single group of seismic-damping partition wall panels 2 slides back from the point c to the point 0, and corresponding coordinates are (0, $-F_{H0}$), where $-F_{H0}$ is a friction damping force of the single group of seismic-damping partition wall panels 2 in this state; point e is a feature point where the single group of seismic-damping partition wall panels 2 slides from the point d to a negative target sliding displacement $-\Delta_H$ (similar to the feature point b, which is not described herein again), and corresponding coordinates are ($-\Delta_H$, $-F_{Hu1}$), where $-F_{Hu1}$ is a friction damping force of the single group of seismic-damping partition wall panels 2 in this state; the point f is a feature point where the single group of seismic-damping partition wall panels 2 just changes when sliding back from a negative target sliding displacement $-\Delta_H$ point to the point 0 (similar to the feature point c, which is not described herein again), and corresponding coordinates are ($-\Delta_H$, $F_{Hu2}$), where $F_{Hu2}$ is a friction damping force of the single group of seismic-damping partition wall panels 2 in this state; and the $F_{Hu1}$ and the $F_{Hu2}$ can be defined as a first friction damping force and a second friction damping force of the single group of seismic-damping partition wall panels 2, respectively;

Step 3.2: establishing an expression between the first friction damping force $F_{Hu1}$ and the second friction damping force $F_{Hu2}$ of the single group of seismic-damping partition wall panels 2.

Assuming that the bonding between partition wall panels (21 to 26) of the single group of seismic-damping partition wall panels 2 is reliable without relative sliding, the single group of seismic-damping partition wall panels 2 is taken as an isolation body for force bearing analysis. The simple diagram of force bearing analysis is shown in FIG. 6.

Figure 6:
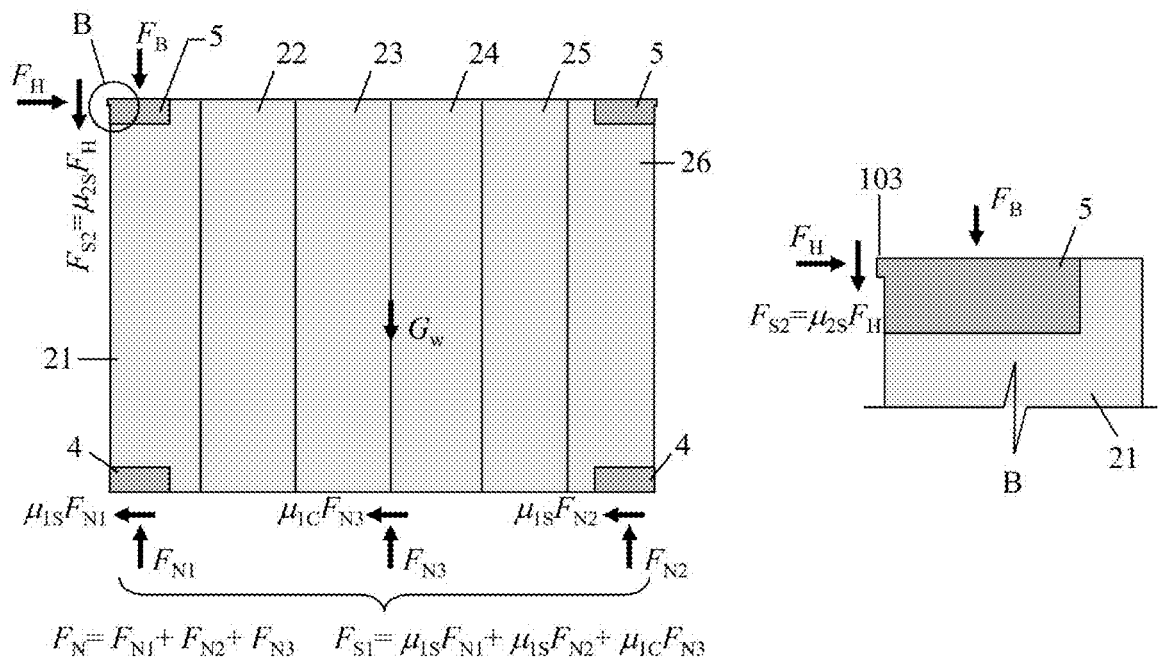
FIG. 6 is a simple diagram of force bearing analysis obtained by performing force bearing analysis on a single group of seismic-damping partition wall panels 2 as an isolation body in embodiment 2.

Referring to FIG. 6, when the structure is subjected to a rightward seismic force action, forces borne by the single group of seismic-damping partition wall panels 2 after sliding include: a gravity $G_w$, which needs to consider a gravity of the single group of seismic-damping partition wall panels 2, a gravity of the anti-shear connecting members 3, a gravity of the lower encased reinforcing boxes 4, a gravity of the upper encased reinforcing boxes 5, and a gravity of the elastic members 6; a vertical compression $F_B$ of the elastic members 6 against the single group of seismic-damping partition wall panels 2, caused by the inter-story deformation and joint rotation of the peripheral frame; a horizontal push force $F_H$ at the top sliding driving point 103 (equal numerically to the friction damping force of the single group of seismic-damping partition wall panels); a vertical downward friction $F_{S2}$ at the top sliding driving point 103; and a normal resultant force $F_N$ and a tangential friction resultant force $F_{S1}$ provided by the partial backing plates 8 and the friction seismic-damping layer 9.

The horizontal push force $F_H$ and the vertical downward friction $F_{S2}$ borne by the single group of seismic-damping partition wall panels 2 are transmitted by the structure to the single group of seismic-damping partition wall panels 2 by means of the peripheral frame, the horizontal force transmission members 7 and the top sliding driving point 103 under the action of seismic force; the horizontal force transmission members 7 are in normal hard contact and tangential friction contact with the top sliding driving point 103, with a coefficient of friction of $\mu_{2S}$, wherein the horizontal push force $F_H$ and the vertical downward friction $F_{S2}$ can be calculated according to the following formulas:

$$F_H = F_{S1}$$

$$F_{S2} = \mu_{2S} F_H$$

Further, the normal resultant force $F_N$ provided by the partial backing plates 8 and the friction seismic-damping layer 9 to the single group of seismic-damping partition wall panels 2 consists of 3 parts including $F_{N1}$, $F_{N2}$ and $F_{N3}$ according to contact relationships and positions; the $F_{N1}$ is a normal force borne by the bottom surface of the lower encased reinforcing box 4 located on a left side in FIG. 6; the $F_{N2}$ is a normal force borne by the bottom surface of the lower encased reinforcing box 4 located on a right side in FIG. 6; and the $F_{N3}$ is a normal force borne by the bottom surface of the single group of seismic-damping partition wall panels 2 from which two lower encased reinforcing boxes 4 are removed in FIG. 6;

$$F_N = F_B + F_{S2} + G_w$$

$$F_N = F_{N1} + F_{N2} + F_{N3}$$

The $F_{N1}$, $F_{N2}$ and $F_{N3}$ can be understood as a normal compression distribution ratio of the bottom surface of the partition wall when the single group of seismic-damping partition wall panels 2 slides from the point 0 to the positive (or negative) target sliding displacement, i.e., the $F_{N1}$, $F_{N2}$ and $F_{N3}$ can be expressed according to the following formulas:

$$F_{N1}=\eta_1 F_N$$

$$F_{N2}=\eta_2 F_N$$

$$F_{N3}=\eta_3 F_N$$

where there always exists $\eta_1+\eta_2+\eta_3=1$; $\eta_1$ is a coefficient of distribution of the normal force borne by the bottom surface of the lower encased reinforcing box 4 located on the left side in FIG. 6; $\eta_2$ is a coefficient of distribution of the normal force borne by the bottom surface of the lower encased reinforcing box 4 located on the right side in FIG. 6; and $\eta_3$ is a coefficient of distribution of the normal force borne by the bottom surface of the single group of seismic-damping partition wall panels 2 from which two lower encased reinforcing boxes 4 are removed in FIG. 6. In some embodiments of the present application, 0.05 may be taken for $\eta_1$, 0.1 to 0.2 may be taken for $\eta_2$, and 0.75 to 0.85 may be taken for $\eta_3$.

Further, the composition of the tangential friction resultant force $F_{S1}$ provided by the partial backing plates 8 and the friction seismic-damping layer 9 to the single group of seismic-damping partition wall panels 2 is similar to that of the normal resultant force $F_N$, including 3 parts as follows: $\mu_{1S}F_{N1}$, $\mu_{1S}F_{N2}$, and $\mu_{1C}F_{N3}$, with the following relationship:

$$F_{S1}=\mu_{1S}F_{N1}+\mu_{1S}F_{N2}+\mu_{1C}F_{N3}$$

where $\mu_{1S}$ and $\mu_{1C}$ are a coefficient of friction between the lower encased reinforcing boxes 4 in the single group of seismic-damping partition wall panels and the partial backing plates 8 and a coefficient of friction between concrete-friction seismic-damping layers, respectively.

The above formulas are combined, and when the single group of seismic-damping partition wall panels 2 slides from the point 0 to the positive target sliding displacement, corresponding to the point b in FIG. 2, the first friction damping force of the single group of seismic-damping partition wall panels can be obtained as follows:

$$F_H = F_{Hu1} = \frac{\kappa}{1-\kappa\mu_{2S}}(F_B + G_w)$$

$$\kappa = \mu_{1S}\eta_1 + \mu_{1S}\eta_2 + \mu_{1C}\eta_3$$

where $\kappa$ is a coefficient of calculation of the first friction damping force.

When the single group of seismic-damping partition wall panels 2 slides from the negative target sliding displacement to the point 0, corresponding to the point f in FIG. 2, the second friction damping force of the single group of seismic-damping partition wall panels can be obtained as follows:

$$F_H = F_{Hu2} = \frac{\kappa'}{1-\kappa'\mu_{2S}}(F_B + G_w)$$

$$\kappa' = \mu_{1S}\eta'_1 + \mu_{1S}\eta'_2 + \mu_{1C}\eta'_3$$

where $F_B$ is a vertical compression of the elastic members 6 against the single group of seismic-damping partition wall panels 2, which is actually a function $f(\varphi)$ of an inter-story displacement ratio $\varphi$ of the peripheral frame where the single group of seismic-damping partition wall panels 2 is located, i.e., $F_B=f(\varphi)=K_B\varphi L_B\lambda$, where $K_B$ is a theoretical required vertical stiffness value of the elastic members 6, and $L_B$ is a vertical distance from a down-press point of the elastic members to a central line of a column section; $\lambda$ is a coefficient of variation between a rigid body frame deformation mechanism and an actual frame deformation mechanism; $G_w$ is a total gravity of the single group of seismic-damping partition wall panels 2; $\mu_{1S}$ and $\mu_{1C}$ are a coefficient of friction between the lower encased reinforcing boxes 4 in the single group of seismic-damping partition wall panels 2 and the partial backing plates 8, and a coefficient of friction between concrete-friction seismic-damping layers 9, respectively; $\mu_{2S}$ is a coefficient of friction between a top sliding driving point 103 of the single group of seismic-damping partition wall panels 2 and a horizontal force transmission member 7; $\eta_1$ and $\eta_2$ are coefficients of distribution of normal forces borne by two corners of a bottom surface of the partition wall when the single group of seismic-damping partition wall panels 2 slides from the point 0 to a positive (or negative) target sliding displacement; $\eta_3$ is a coefficient of distribution of a normal force borne by a middle of the bottom surface of the partition wall when the single group of seismic-damping partition wall panels 2 slides from the point 0 to the positive (or negative) target sliding displacement; $\eta'_1$ and $\eta'_2$ are coefficients of distribution of normal forces borne by the two corners of the bottom surface of the partition wall when the single group of seismic-damping partition wall panels 2 slides back from the positive (or negative) target sliding displacement to the point 0; $\eta'_3$ is a coefficient of distribution of a normal compression in the middle of the bottom surface of the partition wall when the single group of seismic-damping partition wall panels 2 slides from the positive (or negative) target sliding displacement to the point 0; and $\kappa'$ is a coefficient of calculation of the second friction damping force. In some embodiments of the present application, 0.5 to 0.8 may be taken for $\lambda$, 0.05 may be taken for $\eta'_1$, 0.1 to 0.2 may be taken for $\eta_2$, 0.75 to 0.85 may be taken for $\eta_3$, 1 may be taken for $\eta'_1$, 0 may be taken for $\eta'_2$, and 0 may be taken for $\eta'_3$.

Step 3.3: calculating the target sliding displacement $\Delta_H$ of the single group of seismic-damping partition wall panels 2.

The relationship between the sliding displacement $\Delta_w$ of the single group of seismic-damping partition wall panels 2 and the inter-story displacement ratio of the peripheral frame is calculated with reference to the following formula:

$$\Delta_H=\varphi h_w$$

where $\Delta_H$ is a target sliding displacement of the single group of seismic-damping partition wall panels 2; $\varphi$ is an inter-story displacement ratio of the peripheral frame; and $h_w$ is a distance from the bottom surface of the single group of seismic-damping partition wall panels 2 to the top sliding driving point 103.

Step 3.4: calculating the friction hysteretic energy of all the single groups of seismic-damping partition wall panels 2.

The friction hysteretic energy $W_d$ is the sum of areas of restorable force hysteresis loops (see FIG. 2) of all the single groups of seismic-damping partition wall panels 2 in the structure when the relative sliding displacement of the single group of seismic-damping partition wall panels 2 is $\Delta_H$, and can be calculated according to the following formulas:

$$W_d = \sum W_{d,i} = \sum (2F_{H0,i} + F_{Hu1,i} + F_{Hu2,i})\Delta_{H,i}$$

$$F_{H0,i} = nF_{H0} \quad F_{Hu1,i} = nF_{Hu1} \quad F_{Hu2,i} = nF_{Hu2}$$

where $W_{d,i}$ is a total friction hysteretic energy of all the single groups of seismic-damping partition wall panels 2 of ith story of the structure; n is a number of seismic-damping partition walls (groups) of ith story; $\Delta_{H,i}$ is a target sliding displacement of a single group of seismic-damping partition wall panels 2 of ith story; $F_{H0,i}$ is a total sliding force of all the single groups of seismic-damping partition wall panels 2 of ith story; $F_{H0}$ is a sliding force of a single group of seismic-damping partition wall panels 2 of ith story, calculated according to a sliding friction coefficient and a gravity of the single group of seismic-damping partition wall panels 2; $F_{Hu1,i}$ is a sum of first friction damping forces of all the single groups of seismic-damping partition wall panels 2 of ith story; $F_{Hu1}$ is a first friction damping force of a corresponding single group of seismic-damping partition wall panels 2; $F_{Hu2,i}$ is a sum of second friction damping forces of all the single groups of seismic-damping partition wall panels 2 of ith story; and $F_{Hu2}$ is a second friction damping force of a corresponding single group of seismic-damping partition wall panels 2.

Step 4: solving a calculated additional damping ratio $\xi_a$ provided by all the single groups of seismic-damping partition wall panels 2 in the structure for the structure, and subjecting the calculated additional damping ratio $\xi_a$ and the expected additional damping ratio $\xi_{a0}$ to simultaneous comparison; if an expected design target is satisfied, i.e., $\xi_a \geq \xi_{a0}$, determining the first friction damping force $F_{Hu1}$ and the second friction damping force $F_{Hu2}$ of the single group of seismic-damping partition wall panels 2; otherwise, continuing to adjust until the expected design target is satisfied, wherein the calculated additional damping ratio $\xi_a$ is calculated with reference to the following formula:

$$\xi_a = \frac{W_d}{4\pi W_e} \geq \xi_{a0}$$

In some embodiments of the present application, since the structural inter-story shear force $Q_i$ and the inter-story displacement $\Delta_i$ in step 2 are obtained by solving based on the bare frame model without considering the contribution of the lateral resisting force of the seismic-damping partition wall, in step 4, according to actual engineering requirements, after the first friction damping force of each story of seismic-damping partition wall is superimposed to the corresponding structural inter-story shear force, the relationship between the calculated additional damping ratio (which, at this moment, may be referred to as a corrected calculated additional damping ratio $\xi'_a$) and the expected additional damping ratio $\xi_{a0}$ is rechecked, and if the expected design target is still satisfied, the next step continues; otherwise step 1 to step 4 are repeated until the expected design target is satisfied.

Step 5: designing the elastic members 6 according to the requirements for the friction damping forces determined by the single group of seismic-damping partition wall panels 2 described above and in consideration of the elastic deformation requirements of the elastic members 6.

In some embodiments of the present application, the specific construction form of the elastic members 6 includes a compressive rubber pad or a compressive steel component, which can be selected according to actual application scenarios and engineering requirements. For the construction of the compressive rubber pad, a reference for the method for design of vertical stiffness thereof may be made to "Rubber Bearing—Part 3: Elastomeric seismic-protection isolators for buildings" (GB/T 20688.3); for the construction of the compressive steel component, the durability and stability thereof are better than the construction of the compressive rubber pad, and therefore, embodiment 1 provides a schematic appearance diagram and a simple mechanical diagram (FIGS. 7A, 7B) of the construction of the compressive steel component, and the method for design is shown by taking this as an example, and reference is made to the following substeps for details:

Step 5.1: calculating the theoretical required vertical stiffness value $K_B$ of the elastic members 6.

In combination with step 3 and step 4, a required value of a vertical compression $F_B$ of the elastic members 6 against the single group of seismic-damping partition wall panels 2 conforming with an expected design target can be obtained, and thus the theoretical required vertical stiffness value $K_B$ of the elastic members 6 can be calculated with reference to the K following formula:

$$K_B = \frac{F_B}{\varphi L_B \lambda}$$

where $F_B$ is a vertical compression of the elastic members 6 against the single group of seismic-damping partition wall panels 2, basic requirements of vertical compression $F_B$ being determined by step 4 (basic requirements of vertical compression $F_B$ refers to the specific value of vertical compression $F_B$, and the specific value is in correlation with the requirement for the additional damping ratio); $\varphi$ is an inter-story displacement ratio of the peripheral frame 1 where the single group of seismic-damping partition wall panels 2 is located; $L_B$ is a vertical distance from a down-press point of the elastic members 6 to a central line of a column section; and $\lambda$ is a coefficient of variation between a rigid body frame deformation mechanism and an actual frame deformation mechanism, wherein in some embodiments of the present application, 0.5 to 0.8 may be taken for $\lambda$.

Step 5.2: calculating the actual vertical stiffness design value $K_{B,d}$ of the elastic members 6.

The actual vertical stiffness design value $K_{B,d}$ that can be provided by the elastic members 6 can be calculated with reference to the following formula:

$$K_{B,d} = 4E\frac{bt^3}{L^3} = \gamma K_B = \gamma \frac{F_B}{\varphi L_B \lambda}$$

where E is an elasticity modulus of the steel simply-supported beam 61; b is a sectional width of the steel simply-supported beam 61; t is a sectional thickness of the steel simply-supported beam 61; L is an effective span of the steel simply-supported beam 61; γ is a design tolerance, and is 0.95 to 1.05 in some embodiments of the present application; $K_B$ is a theoretical required vertical stiffness value of the elastic members 6; and $F_B$ is a vertical compression of the elastic members against the seismic-damping partition wall, basic requirements being determined by step 4.

It can be found that the actual vertical stiffness design value $K_{B,d}$ that can be provided by the elastic members 6 is related to the geometric parameter dimensions (such as the sectional width, sectional thickness and effective span of the steel simply-supported beam 61) of the elastic members 6. Therefore, when the actual vertical stiffness design value $K_{B,d}$ that can be provided by the elastic members 6 does not satisfy the requirement of the above formula, the geometric parameter dimensions of the elastic members 6 need to be redesigned so as to satisfy the requirement of the above formula.

Step 5.3: calculating a maximum elastic deflection deformation $\Delta_y$ that can be provided by the elastic members 6.

On the basis that the actual vertical stiffness design value $K_{B,d}$ that can be provided by the elastic members 6 in step 5.2 satisfies the requirement, the maximum elastic deflection deformation $\Delta_y$ of the steel simply-supported beam 61 within the elastic range still need not to be less than the maximum down-press deflection of the elastic members 6 when the single group of seismic-damping partition wall panels 2 is under the target inter-story displacement ratio, and therefore, for the check of the maximum elastic deflection deformation $\Delta_y$, reference is made to the following formula:

$$\Delta_y = \frac{L^2}{6Et} f_y \geq \varphi L_B \lambda$$

where L is an effective span of the steel simply-supported beam 61; E is an elasticity modulus of the steel simply-supported beam 61; t is a sectional thickness of the steel simply-supported beam 61; $f_y$ is a yield strength of the steel simply-supported beam 61; φ is an inter-story displacement ratio of the peripheral frame where the single group of seismic-damping partition wall panels 2 is located; $L_B$ is a vertical distance from a down-press point of the elastic members 6 to a central line of a column section; and λ is a coefficient of variation between a rigid body frame deformation mechanism and an actual frame deformation mechanism, wherein in some embodiments of the present application, 0.5 to 0.8 may be taken for λ.

It can be found that the maximum elastic deflection deformation $\Delta_y$ that can be provided by the elastic members 6 is related to the geometric parameter dimensions (such as the sectional thickness and effective span of the steel simply-supported beam 61) of the elastic members 6 and the yield strength of the material. Therefore, when the maximum elastic deflection deformation $\Delta_y$ that can be provided by the elastic members 6 is less than the maximum down-press deflection ($\varphi L_B \lambda$) of the elastic members 6 when the single group of seismic-damping partition wall panels 2 is under the corresponding inter-story displacement ratio, the geometric parameter dimensions of the elastic members 6 or the material used in the elastic members 6 need to be readjusted to satisfy the design requirements, and step 5.2 and step 5.3 need to be repeated as necessary to redesign the elastic members 6 until the design requirements are satisfied.

Step 6: designing the anti-shear connecting members 3 according to the requirements for the friction damping forces determined by the single group of seismic-damping partition wall panels 2 described above.

Figure 8:
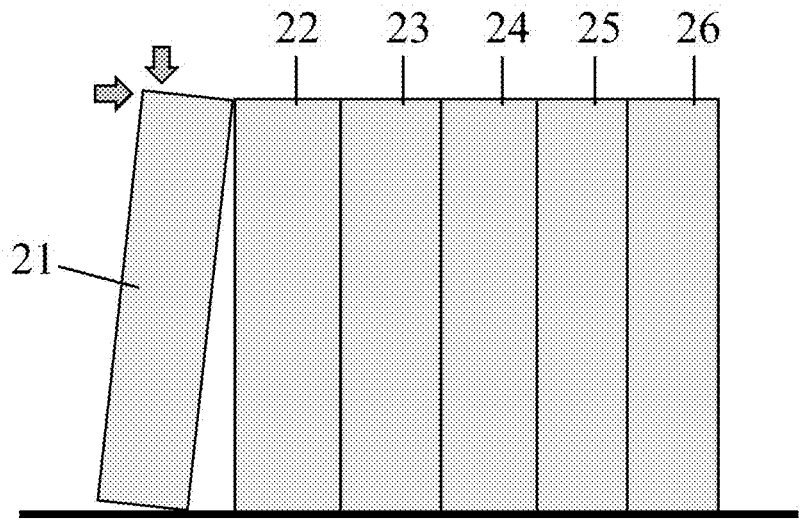
FIG. 8 is a schematic diagram of a typical failure mode of a seismic-damping partition wall with variable-friction energy dissipation provided by embodiment 2.
Figure 9:
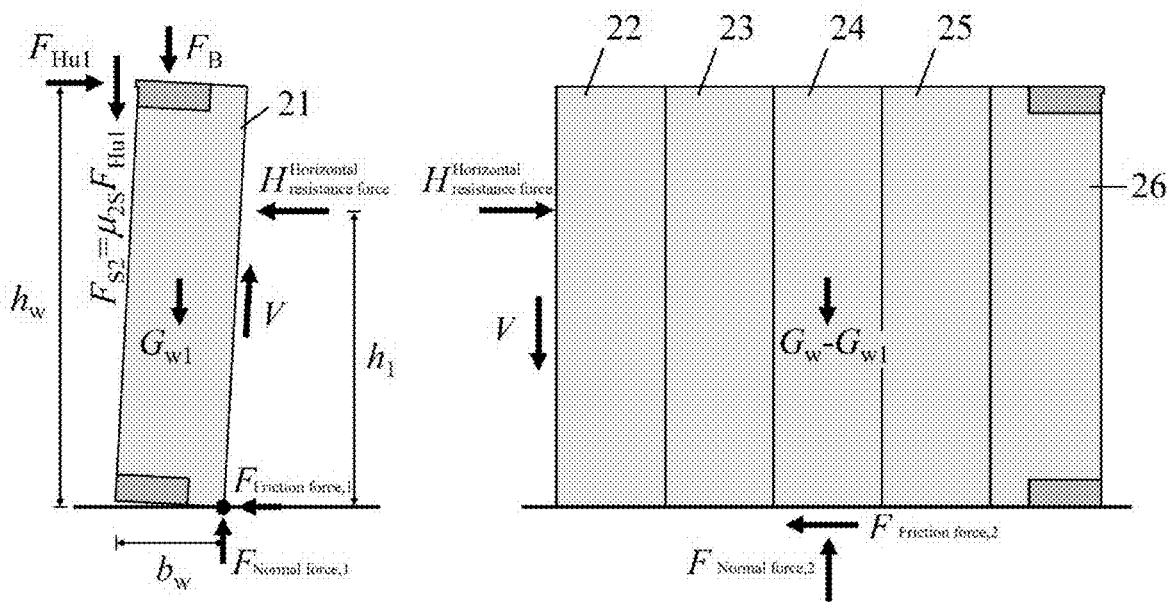
FIG. 9 is a simple diagram of force bearing analysis when a first partition wall panel 21 in a single group of seismic-damping partition wall panels 2 provided by embodiment 2 undergoes critical rocking.

The method for design of the anti-shear connecting members 3 provided by the present application aims to avoid the rocking of the single group of seismic-damping partition wall panels 2 in a working phase and the relative sliding deformation between the partition wall panels by means of the design. It needs to be noted that a seismic-damping partition wall with variable-friction energy dissipation as shown in FIG. 3 is found based on finite element numerical simulation, and when the anti-shear bearing force at the joint between all the anti-shear connecting members 3 in the single group of seismic-damping partition wall panels 2 is the same, the connection between the anti-shear connecting members 3 between the first partition wall panel 21 and the second partition wall panel 22 will become the most dangerous section. Further, if the anti-shear bearing force at the connection between all the anti-shear connecting members 3 is relatively low at this time, the first partition wall panel 21 will rock and undergo deformation relative to the second partition wall panel 22 (FIG. 8). Based on the above failure model, FIG. 9 shows a simple diagram of force bearing analysis when the first partition wall panel 21 undergoes critical rocking. To simplify the calculation, in this step, it is assumed that the single group of seismic-damping partition wall panels 2 is in friction contact with the friction seismic-damping layers 9 in a concrete-friction seismic-damping layer manner, which can therefore be expressed by the coefficient of friction $\mu_{1C}$ between the concrete-friction seismic-damping layers, and the maximum critical shear force V when the first partition wall panel 21 undergoes critical rocking can be obtained according to the force balance relationship:

$$V = \frac{F_{Hu1}(h_w - \mu_{2S} b_w) - F_B x - G_{w1} b_w/2}{\mu_{1C} \beta h_1} - (G_w - G_{w1})$$

where $F_{Hu1}$ is a first friction damping force of the single group of seismic-damping partition wall panels 2; $h_w$ is a distance from the bottom surface of the single group of seismic-damping partition wall panels 2 to the top sliding driving point 103; $\mu_{2S}$ is a coefficient of friction between the top sliding driving point 103 in the single group of seismic-damping partition wall panels 2 and the horizontal force transmission member 7; $b_w$ is a width of a single partition wall panel in the single group of seismic-damping partition wall panels 2; $F_B$ is a vertical compression of the elastic members 6 against the single group of seismic-damping partition wall panels 2; x is a distance from an acting point of a concentrated load of the elastic members 6 to a right edge of a first partition wall panel 21; $G_{w1}$ is a gravity of the first partition wall panel 21 in the single group of seismic-damping partition wall panels 2; $G_w$ is a total gravity of the single group of seismic-damping partition wall panels 2; $h_1$ is a distance from an acting point of a horizontal resistance force borne by the first partition wall panel 21 to a bottom surface of the first partition wall panel; and β is a safety reserve factor, and is 0.7 to 0.9 in some embodiments of the present application.

It can be found that the maximum critical shear force V when the first partition wall subpanel 21 undergoes critical rocking obtained by the above formula is actually the same as the maximum critical shear force (effect) expected to be borne at the joint between the anti-shear connecting members 3 in the single group of seismic-damping partition wall panels 2, and therefore, when the anti-shear connecting members 3 are arranged according to the typical construction in FIG. 3, the anti-shear bearing force $V_s$ for achieving a reliable connection at the connection between the anti-shear connecting members 3 in the single group of seismic-damping partition wall panels 2 needs to satisfy the following relationship:

$$V_s \geq \psi V$$

where $\psi$ is a coefficient of adjustment of a shear force at a connection between single anti-shear connecting members, and may be 0.6 in some embodiments of the present application;

Step 7: performing damage control check on concrete panels near the lower encased reinforcing boxes 4 of the single group of seismic-damping partition wall panels 2 according to the requirements for the friction damping forces determined by the single group of seismic-damping partition wall panels 2 described above.

When the single group of seismic-damping partition wall panels 2 slides back from the positive (or negative) target sliding displacement $\Delta_H$ (or $-\Delta_H$) to the point 0, the overturning moment borne thereby is generally greater than the anti-overturning moment (the anti-overturning moment is provided by the gravity $G_w$ of the single group of seismic-damping partition wall panels 2), and therefore, the single group of seismic-damping partition wall panels 2 will undergo a certain degree of rocking, causing the damage to concrete at the corners of the single group of seismic-damping partition wall panels 2 due to stress concentration. An effective method for solving this problem is to arrange the lower encased reinforcing boxes 4 for the single group of seismic-damping partition wall panels 2, but damage control check still needs to be performed on the concrete wall panels near the lower encased reinforcing boxes 4, and for the method for check, reference is made to the following formulas:

$$\sigma_c \leq [\alpha f_c]$$

$$\sigma_c = \frac{\mu_{2S} F_{Hu1} + F_B + G_w}{\omega A_c}$$

where $\sigma_c$ is a compressive stress of concrete wall panels near the lower encased reinforcing boxes 4 of the single group of seismic-damping partition wall panels 2; $\alpha$ is a safety factor when the damage control check is performed on the concrete wall panels, and may be 0.7 in some embodiments of the present application; $f_c$ is an axial compressive strength of a concrete material in the single group of seismic-damping partition wall panels 2; $F_{Hu1}$ is a first friction damping force of the single group of seismic-damping partition wall panels 2; $\mu_{2S}$ is a coefficient of friction between the top sliding driving point 103 in the single group of seismic-damping partition wall panels 2 and the horizontal force transmission member 7; $\omega$ is an area reduction factor when the damage control check is performed on the concrete wall panels (i.e., seismic-damping partition wall), and may be 0.4 in some embodiments of the present application; $A_c$ is a horizontal projection area of the lower encased reinforcing boxes 4; $F_B$ is vertical compression of the elastic members 6 against the single group of seismic-damping partition wall panels 2; and $G_w$ is a total gravity of the single group of seismic-damping partition wall panels 2;

Step 8: completing parametrization design of the single group of seismic-damping partition wall panels 2 after completing the design of connection between the elastic members 6 and the anti-shear connecting members 3 and performing damage control check on concrete wall panels near the lower encased reinforcing boxes 4 according to the requirements for the friction damping forces determined by the single group of seismic-damping partition wall panels 2 described above.

Embodiment 3

To further show the beneficial effects and feasibility of the present application, in this embodiment, based on the construction of FIG. 3, finite element numerical modeling analysis is performed on one-story and one-bay single group of seismic-damping partition wall panels 2-steel frame sample specimen, and the flow of parametrization design of the single groups of seismic-damping partition wall panels 2 is completed according to the following content and steps.

1. Description of General Situation

The sample specimen has a layer height of 2800 mm, the column center line distance is 4100 mm, the left frame column 11 and the right frame column 12 are made of a Q355 welding box-type column, with the cross-sectional dimensions of 300×300×14×14 mm; the upper frame beam 13 and the lower frame beam 14 of the sample specimen are made of Q235 hot-rolled H-shaped steel, with the sectional dimensions of 400×200×8×13 mm; the left and right ends of the upper frame beam 13 are in rigid connection with the left frame column 11 and the right frame column 12 by means of welding and beam flange widened connection; the structural design satisfies requirements such as "strong column and weak beam", a limit value of a slenderness ratio of columns, and an anti-seismic check of a beam-column node domain.

2. Key Parameters

TABLE 1

Parameters of a seismic-damping partition wall determined according to an expected design target

| $\xi_{a0}$ (%) | $\mu_{1S}$ | $\mu_{1C}$ | $\mu_{2S}$ | $K_B$ (kN/mm) | $L_B$ (mm) | $\lambda$ | $G_w$ (kN) | $h_w$ (mm) | $b_w$ (mm) | x (mm) | $h_1$ (mm) |
|---|---|---|---|---|---|---|---|---|---|---|---|
| 2.0 | 0.35 | 0.6 | 0.4 | 19 | 445 | 0.6 | 20.57 | 2095 | 600 | 395 | 1800 |

The finite element numerical model of the sample test-pieces is constructed by using general finite element software ABAQUS according to the actual dimensions and detail construction of the sample test-pieces. Table 1 summarizes the important dimensions and construction parameters in the sample test-pieces that influence the performance of the single group of seismic-damping partition wall panels 2, wherein in this embodiment, the expected additional damping ratio $\xi_{a0}$ is determined according to that the additional damping ratio provided by the single group of seismic-damping partition wall panels 2 for the sample test-pieces is not less than 2% when the sample test-pieces undergo a 2% inter-story displacement ratio.

3. Flow of Design

Step 1:

In this embodiment, an one-story and one-bay steel frame sample specimen without the single group of seismic-damping partition wall panels 2 (hereinafter referred to as uncontrolled sample specimen for short) are constructed first by using general finite element software ABAQUS. To obtain the inter-story shear force of the uncontrolled sample specimen under a 2% inter-story displacement ratio, a corresponding inter-story displacement under the 2% inter-story displacement ratio is applied to the uncontrolled sample specimen. According to the results of finite element numerical simulation, inter-story shear force of uncontrolled sample specimen Q=823 KN, inter-story displacement Δ=56 mm Step 2:

In this embodiment, the expected additional damping ratio $\xi_{a0}$ is determined according to that the additional damping ratio provided by the single group of seismic-damping partition wall panels 2 for the sample specimen is not less than 2.0% when the sample specimen undergo a 2.0% inter-story displacement ratio; further, the elastic strain energy $W_e$=23044 kN·mm of the structure can be obtained according to the results of numerical simulation calculation of step 1.

Figure 10:
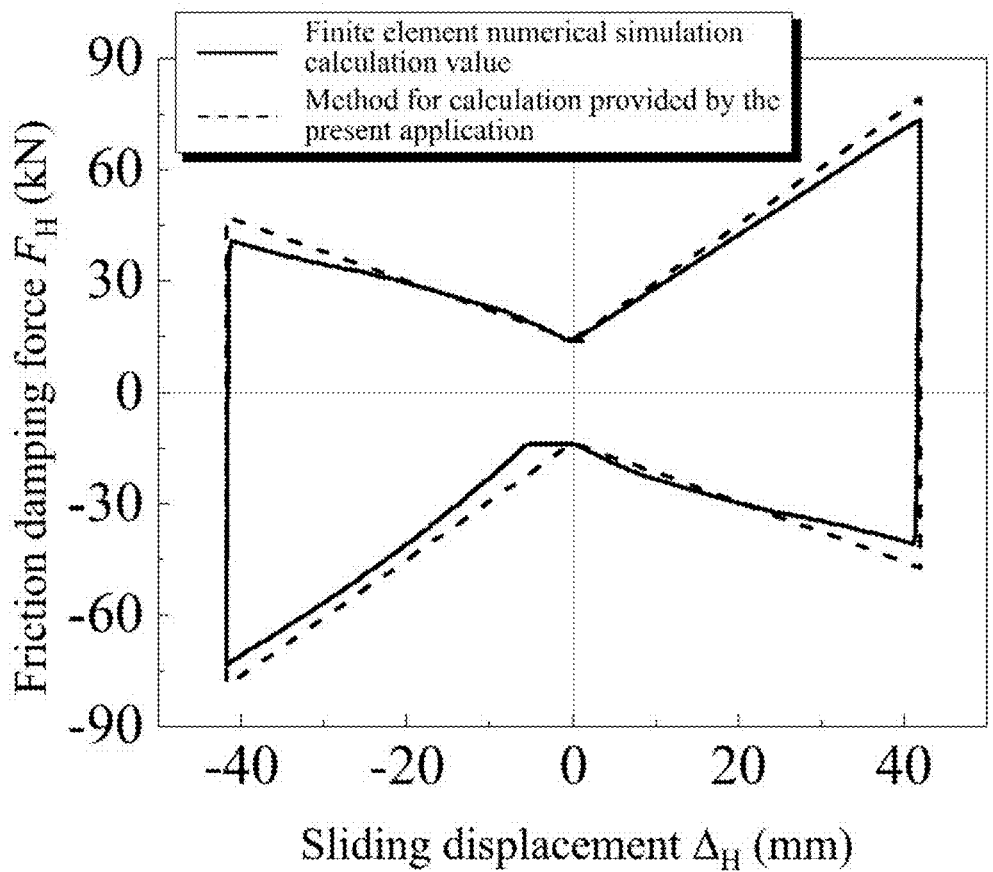
FIG. 10 is a comparison diagram of a finite element numerical simulation value and a theoretical calculation value of a friction damping force-sliding displacement curve of a single group of seismic-damping partition wall panels 2 in embodiment 3.

Step 3:

In this embodiment, key feature points of the friction damping force-sliding displacement curve of the single group of seismic-damping partition wall panels 2 are calculated by using formulas (11) and (12), and after the relevant parameters in table 1 are substituted, $F_{H0}$=14.08 KN, $F_{Hu1}$=79.31 kN, and $F_{Hu2}$=47.13 KN can be obtained; further, according to the relationship between the single group of seismic-damping partition wall panels 2 and the inter-story displacement ratio of the peripheral frame, a target sliding displacement $\Delta_H$=41.91 mm of the single group of seismic-damping partition wall panels 2 under a 2% inter-story displacement ratio can be obtained; further, according to the coordinates of 7 feature points, the friction damping force-sliding displacement curve of the single group of seismic-damping partition wall panels 2 in this embodiment is drawn, as shown by a dotted line in FIG. 10; further, the friction hysteretic energy $W_d$=6479.29 kN·mm of the single group of seismic-damping partition wall panels 2 is calculated according to formula (1).

Step 4:

The solved structural elastic strain energy and the friction hysteretic energy of the single group of seismic-damping partition wall panels 2 are substituted into formula (3) so that a calculated additional damping ratio $\xi_a$=2.23%>$\xi_{a0}$=2.0% can be obtained, and therefore, the single group of seismic-damping partition wall panels 2 designed according to table 1 can preliminarily satisfy an expected design target;

Further, in this embodiment, considering the contribution of the lateral resisting force of the single group of seismic-damping partition wall panels 2, the inter-story shear force is corrected, then corrected inter-story shear force of a steel frame structure with single groups of seismic-damping partition wall panels 2 (hereinafter a controlled sample specimen for short) Q'=902.31 kN, and corrected elastic strain energy W'$_e$=25264.68 kN·mm; further, the relationship between the corrected calculated additional damping ratio $\xi'_a$ with the expected additional damping ratio $\xi_{a0}$ is compared, and it is found that $\xi'_a$=2.04%>$\xi_{a0}$=2.0% satisfying the expected design target.

Figure 7A:
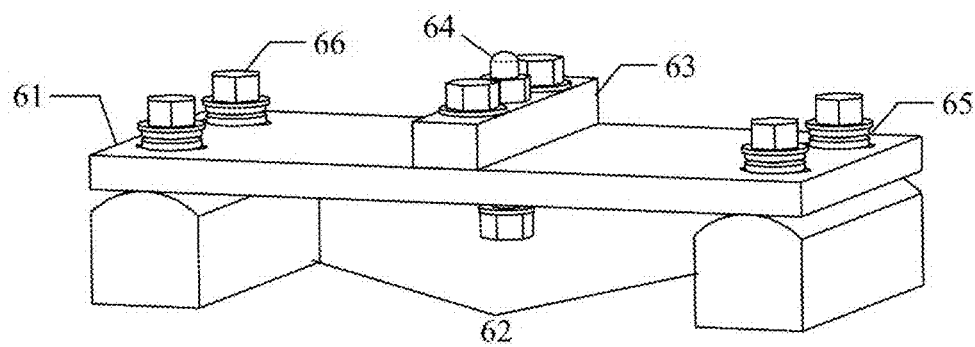
FIG. 7A is a schematic diagram of a typical construction form of a compressive steel component provided by embodiment 2.
Figure 7B:
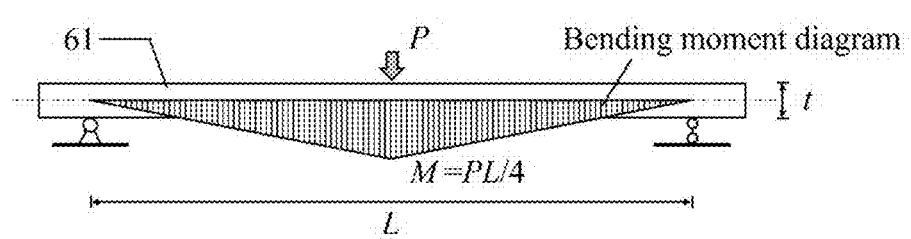
FIG. 7B is a simple mechanical diagram of a typical construction form of a compressive steel component provided by embodiment 2.

Step 5:

In this embodiment, the elastic members 6 adopt the construction of the compressive steel component in embodiment 1 (as shown in FIGS. 7A, 7B). According to the requirements for the friction damping force determined in the described steps, the theoretical required vertical stiffness value $K_B$≠19 kN/mm of the elastic members 6 can be obtained; further, by setting the actual vertical stiffness design value $K_{B,d}$=$\gamma K_B$ of the elastic members 6 and ensuring that the maximum elastic deflection deformation $\Delta_y$ of the elastic members 6 is not less than the maximum downpress deflection ($\varphi L_B \lambda$) of the elastic members 6 when the single group of seismic-damping partition wall panels 2 is under a 2% displacement ratio, the selected material and geometric parameter dimensions of the elastic members 6 can be obtained as follows: the steel simply-supported beam 61 is made of 60Si$_2$Mn steel (i.e., spring steel, with a yield strength of $f_y$=1375 MPa), with a sectional thickness of t=15 mm, a sectional width of b=150 mm, and an effective span of L=280 mm Step 6:

This embodiment is described by using an example in which three groups of anti-shear connecting members 3 in welded connection (as shown in FIG. 3) are arranged between partition wall panels. According to formula (6) and formula (7), the critical shear force V=90.01 kN between the partition wall panels can be obtained, and therefore, the anti-shear bearing force $V_s$ at the connection between the anti-shear connecting members 3 need not to be less than 54 kN; further, when a welded connection is used, the fillet weld thickness at the connection between the anti-shear connecting members 3 is $h_e$=5 mm, and the effective calculated length of a welding seam is $l_w$=60 mm, which can satisfy the target requirements that the partition wall panels of the single group of seismic-damping partition wall panels 2 do not undergo rocking in a working phase and a relative sliding deformation does not occur between the partition wall panels.

Step 7:

In this embodiment, the single group of seismic-damping partition wall panels 2 is made of LC15 grade ($f_c$=10 MPa) lightweight concrete, the thickness of the lower encased reinforcing boxes 4 and the upper encased reinforcing boxes 5 in the single group of seismic-damping partition wall panels 2 is 10 mm, and the projection area of the encased reinforcing boxes at corners is $A_c$=60000 mm$^2$; further, according to formula (8) and formula (9), damage control check is performed on the concrete near the encased reinforcing boxes at the corners of the single group of seismic-damping partition wall panels 2, and it is found that $\sigma_c \leq$[0.7 $f_c$], satisfying the requirements of damage control check.

Step 8:

The design of the seismic-damping partition wall with variable-friction energy dissipation is completed.

In addition, in this embodiment, a finite element numerical model is still constructed for the controlled sample test-pieces in step 4, and by applying a cyclic load with an inter-story displacement ratio of ±2.0% to the finite element numerical model, the actual friction damping force-sliding displacement curve of the single group of seismic-damping partition wall panels 2 in the finite element numerical model can be obtained (as shown by a solid line in FIG. 10); further, by comparing the actual friction damping force-sliding displacement curve with the theoretical friction damping force-sliding displacement curve provided by the present application, it is found that the prediction method for the friction damping force-sliding displacement curve provided by the present application can reflect the restoration force curve and working mechanism of the single group of seismic-damping partition wall panels 2 more accurately, and has feasibility and effectiveness.

The above describes the specific implementations of the present application in combination with the drawings, but does not limit the scope of protection of the present application. It needs to be understood by those skilled in the art that based on the technical solutions of the present application, various modifications or variations that can be made by those skilled in the art without any creative effort still fall within the scope of protection of the present application.

What is claimed is:

1. A method for design of a seismic-damping partition wall with variable-friction energy dissipation, wherein the seismic-damping partition wall comprises a peripheral frame and a single group of seismic-damping partition wall panels arranged in the peripheral frame, upper encased reinforcing boxes and lower encased reinforcing boxes are arranged at corners of a top end and a bottom end of the single group of seismic-damping partition wall panels, respectively, elastic members are arranged between the upper encased reinforcing boxes and the peripheral frame, partial backing plates are arranged at a bottom of the single group of seismic-damping partition wall panels and below the lower encased reinforcing boxes, the single group of seismic-damping partition wall panels comprises a plurality of partition wall panels, and anti-shear connecting members are arranged between adjacent partition wall panels; and the method comprises following steps:

step 1: building a bare frame structure model without considering lateral resisting stiffness of a partition wall, and calculating an inter-story shear force and an inter-story displacement of a structure under action of an earthquake;

step 2: according to the inter-story shear force and the inter-story displacement obtained in step 1, calculating an elastic strain energy $W_e$ of the structure, and determining an expected additional damping ratio $\xi_{a0}$ provided by a seismic-damping partition wall in the structure for the structure;

step 3: according to a friction damping force-sliding displacement curve of the single group of seismic-damping partition wall panels, establishing a relational expression between a total friction hysteretic energy $W_d$ of the seismic-damping partition wall in the structure and a first friction damping force $F_{Hu1}$, a second friction damping force $F_{Hu2}$ and a target sliding displacement $\Delta_H$ of the single group of seismic-damping partition wall panels, and calculating the total friction hysteretic energy $W_d$:

$$W_d = \sum W_{d,i} = \sum (2F_{H0,i} + F_{Hu1,i} + F_{Hu2,i})\Delta_{H,i}$$

$$F_{H0,i} = nF_{H0} F_{Hu1,i} = nF_{Hu1} F_{Hu2,i} = nF_{Hu2}$$

where $W_{d,i}$ is a total friction hysteretic energy of all the single groups of seismic-damping partition wall panels of an ith story of the structure; n is a number of seismic-damping partition walls or seismic-damping partition wall groups of the ith story: $\Delta_{H,i}$ is a target sliding displacement of a single group of seismic-damping partition wall panels of the 4 th story: $F_{H0,i}$ is a total sliding occurrence force of all the single groups of seismic-damping partition wall panels of the ith story; $F_{H0}$ is a sliding occurrence force of a single group of seismic-damping partition wall panels of the ith story, calculated according to a sliding friction coefficient and a gravity of the single group of seismic-damping partition wall panels; $F_{Hu1,i}$ is a sum of first friction damping forces of all the single groups of seismic-damping partition wall panels of the ith story; $F_{Hu1}$ is a first friction damping force of a corresponding single group of seismic-damping partition wall panels; $F_{Hu2,i}$ is a sum of second friction damping forces of all the single groups of seismic-damping partition wall panels of the ith story; and $F_{Hu2}$ is a second friction damping force of a corresponding single group of seismic-damping partition wall panels;

wherein abscissas of the friction damping force-sliding displacement curve of the single group of seismic-damping partition wall panels represent a sliding displacement $\Delta_w$ of the single group of seismic-damping partition wall panels, ordinates represent a friction damping force $F_H$ of the single group of seismic-damping partition wall panels, and the friction damping force-sliding displacement curve of the single group of seismic-damping partition wall panels is determined by means of a plurality of feature points in end-to-end connection closure on the friction damping force-sliding displacement curve of the single group of seismic-damping partition wall panels;

wherein a number of the feature points is 7, and the 7 feature points are defined as point 0 and point a to point f; the point 0 is coordinate point 0; the point a is a feature point when the single group of seismic-damping partition wall panels slides just after overcoming a maximum static friction, and corresponding coordinates are $(0, F_{H0})$, where $F_{H0}$ is a sliding occurrence force of the single group of seismic-damping partition wall panels; point b is a feature point where the single group of seismic-damping partition wall panels slides from the point a to a positive target sliding displacement $\Delta_H$, and corresponding coordinates are $(\Delta_H, F_{Hu1})$, where $F_{Hu1}$ is a friction damping force of the single group of seismic-damping partition wall panels in this state; point c is a feature point where the single group of seismic-damping partition wall panels just changes when sliding back from a positive target sliding displacement $\Delta_H$ point to the point 0, and at this moment, it is considered that a sliding displacement of the partition wall remains unchanged, i.e., $\Delta_w = \Delta_H$, but a direction and a magnitude of the friction damping force change, and corresponding coordinates are $(\Delta_H, -F_{Hu2})$, where $-F_{Hu2}$ is a friction damping force of the single group of seismic-damping partition wall panels in this state; point d is a feature point where the single group of seismic-damping partition wall panels slides back from the point c to the point 0, and corresponding coordinates are $(0, -F_{H0})$, where $-F_{H0}$ is a friction damping force of the single group of seismic-damping partition wall panels in this state; point e is a feature point where the single group of seismic-damping partition wall panels slides from the point d to a negative target sliding displacement $-\Delta_H$, and corresponding coordinates are (group $-\Delta_H, -F_{Hu1}$), where $-F_{Hu1}$ is a friction damping force of the single of seismic-damping partition wall panels in this state; the point f is a feature point where the single group of seismic-damping partition wall panels just changes when sliding back from a negative target sliding displacement $-\Delta_H$ point to the point 0, and corresponding coordinates are $(-\Delta_H, F_{Hu2})$, where $F_{Hu2}$ is a friction damping force of the single group of seismic-damping partition wall panels in this state step 4: solving a calculated additional damping ratio $\xi_a$ provided by the seismic-damping partition wall for the structure, and subjecting the calculated additional damping ratio $\xi_a$ and the expected additional damping ratio $\xi_{a0}$ to simultaneous comparison; if an expected design target is satisfied, i.e., $\xi_a \geq \xi_{a0}$, determining the first friction damping force $F_{Hu1}$ and the second friction damping force $F_{Hu2}$ of the single group of seismic-damping partition wall panels; otherwise, continuing to adjust until the expected design target is satisfied, wherein a formula for the calculated additional damping ratio $\xi_a$ is:

$$\xi_a = \frac{W_d}{4\pi W_e} \geq \xi_{a0}$$

step 5: according to vertical compression requirements and elastic deformation requirements of the elastic members in the single group of seismic-damping partition wall panels, designing construction of the elastic members, wherein an actual vertical stiffness design value $K_{B,d}$ and an elastic deformation requirement $\Delta_y$ of the elastic members need to simultaneously satisfy following formulas:

$$K_{B,d} = \gamma K_B = \gamma \frac{F_B}{\varphi L_B \lambda}$$

$$\Delta_y \geq \varphi L_B \lambda$$

where $\gamma$ is a design tolerance; $K_B$ is a theoretical required vertical stiffness value of the elastic members; $F_B$ is a vertical compression of the elastic members against the seismic-damping partition wall; $\varphi$ is an inter-story displacement ratio of the peripheral frame where the single group of seismic-damping partition wall panels is located; $L_B$ is a vertical distance from a down-press point of the elastic members to a central line of a column section; and $\lambda$ is a coefficient of variation between a rigid body frame deformation mechanism and an actual frame deformation mechanism;

step 6: according to the first friction damping force $F_{Hu1}$ of the single group of seismic-damping partition wall panels, calculating an anti-shear bearing force $V_s$ at a connection between the anti-shear connecting members, and designing a form and construction of connection between the anti-shear connecting members;

step 7: performing damage control check on concrete wall panels near the lower encased reinforcing boxes of the single group of seismic-damping partition wall panels; and step 8: completing the design of the seismic-damping partition wall with variable-friction energy dissipation.

2. The method for design of a seismic-damping partition wall with variable-friction energy dissipation according to claim 1, wherein a calculation formula for the elastic strain energy of the structure in step 2 is:

$$W_e = \sum W_{e,i} = \frac{1}{2} \sum Q_i \Delta_i$$

where $W_{e,i}$ is an elastic strain energy of the ith story of the structure; $Q_i$ is an W inter-story shear force of the ith story of the structure; and $\Delta_i$ is an inter-story displacement of the ith story of the structure.

3. The method for design of a seismic-damping partition wall with variable-friction energy dissipation according to claim 1, wherein the expected additional damping ratio $\xi_{a0}$ provided by the seismic-damping partition wall for the structure in step 2 is determined according to the inter-story displacement ratio of the structure.

4. The method for design of a seismic-damping partition wall with variable-friction energy dissipation according to claim 1, wherein the first friction damping force $F_{Hu1}$ and the second friction damping force $F_{Hu2}$ are calculated by means of the following formula:

$$F_{Hu1} = \frac{\kappa}{1 - \kappa \mu_{2S}}(F_B + G_w)$$

$$F_{Hu2} = \frac{\kappa'}{1 - \kappa' \mu_{2S}}(F_B + G_w)$$

$$\kappa = \mu_{1S}\eta_1 + \mu_{1S}\eta_2 + \mu_{1C}\eta_3$$

$$\kappa' = \mu_{1S}\eta'_1 + \mu_{1S}\eta'_2 + \mu_{1C}\eta'_3$$

where $F_B$ is a vertical compression of the elastic members against the single group of seismic-damping partition wall panels; $G_w$ is a total gravity of the single group of seismic-damping partition wall panels; $\mu_{1S}$ and $\mu_{1C}$ are a coefficient of friction between the lower encased reinforcing boxes in the single group of seismic-damping partition wall panels and the partial backing plates, and a coefficient of friction between concrete-friction seismic-damping layers, respectively; $\mu_{2S}$ is a coefficient of friction between a top sliding driving point of the single group of seismic-damping partition wall panels and a horizontal force transmission member; $\eta_1$ and $\eta_2$ are coefficients of distribution of normal compressions at two corners of a bottom surface of the partition wall when the single group of seismic-damping partition wall panels slides from the point 0 to a positive or negative target sliding displacement; $\eta_3$ is a coefficient of distribution of a normal compression in a middle of the bottom surface of the partition wall when the single group of seismic-damping partition wall panels slides from the point 0 to the positive or negative target sliding displacement; n'$_1$ and n'$_2$ are coefficients of distribution of normal compressions at the two corners of the bottom surface of the partition wall when the single group of seismic-damping partition wall panels slides back from the positive or negative target sliding displacement to the point 0; $\eta'_3$ is a coefficient of distribution of a normal compression in the middle of the bottom surface of the partition wall when the single group of seismic-damping partition wall panels slides back from the positive or negative target sliding displacement to the point 0; κ is a coefficient of calculation of the first friction damping force; and κ' is a coefficient of calculation of the second friction damping force.

5. The method for design of a seismic-damping partition wall with variable-friction energy dissipation according to claim 1, wherein in step 4, according to actual engineering requirements, the inter-story shear force and the elastic strain energy of the structure are corrected by considering a friction damping force, then a relationship between a corrected calculated additional damping ratio $\xi'_a$ and the expected additional damping ratio $\xi_{a0}$ are checked, and the corrected calculated additional damping ratio $\xi'_a$ is adjusted to satisfy a design target.

6. The method for design of a seismic-damping partition wall with variable-friction energy dissipation according to claim 1, wherein the elastic members in step 5 are constructed and designed according to requirements of the first friction damping force $F_{Hu1}$ and the second friction damping force $F_{Hu2}$ of the single group of seismic-damping partition wall panels and the elastic deformation requirements of the elastic members.

7. The method for design of a seismic-damping partition wall with variable-friction energy dissipation according to claim 1, wherein the anti-shear bearing force $V_s$ of the anti-shear connecting members in step 6 is proposed based on a control target in which the partition wall panels in the single group of seismic-damping partition wall panels do not rock and a relative sliding deformation does not occur between the partition wall panels, and the anti-shear bearing force $V_s$ needs to satisfy $$V_s \geq \psi V$$

$$V = \frac{F_{Hu1}(h_w - \mu_{2S}b_w) - F_B x - G_{w1}b_w/2}{\mu_{1C}\beta h_1} - (G_w - G_{w1})$$

where ψ is a coefficient of adjustment of a shear force at a connection between single anti-shear connecting members; V is a maximum critical shear force expected to be borne by the connection between the anti-shear connecting members; $h_w$ is a distance from a bottom surface of the single group of seismic-damping partition wall panels to a top sliding driving point; $\mu_{2S}$ is a coefficient of friction between the top sliding driving point of the single group of seismic-damping partition wall panels and a horizontal force transmission member; $b_w$ is a width of a single partition wall panel in the single group of seismic-damping partition wall panels; $F_B$ is a vertical compression of the elastic members against the single group of seismic-damping partition wall panels; x is a distance from an acting point of a concentrated load of the elastic members to a right edge of a first partition wall panel; $G_{w1}$ is a gravity of the first partition wall panel in the single group of seismic-damping partition wall panels; $G_w$ is a total gravity of the single group of seismic-damping partition wall panels; $\mu_{1C}$ is a coefficient of friction between concrete-friction seismic-damping layers; β is a safety reserve factor; and $h_1$ is a distance from an acting point of a horizontal resistance force borne by the first partition wall panel to a bottom surface of the first partition wall panel.

8. The method for design of a seismic-damping partition wall with variable-friction energy dissipation according to claim 1, wherein a method for damage control check of the seismic-damping partition wall in step 7 is proposed on a premise that concrete in encased reinforcing boxes at corners of the seismic-damping partition wall is not broken prior to concrete outside the encased reinforcing boxes, and the method for check is:

$$\sigma_c \leq [\alpha f_c]$$

$$\sigma_c = \frac{\mu_{2S}F_{Hu1} + F_B + G_w}{\omega A_c}$$

where $\sigma_c$ is a compressive stress of concrete near the lower encased reinforcing boxes of the single group of seismic-damping partition wall panels; α is a safety factor when the damage control check is performed on the concrete wall panels; $f_c$ is an axial compressive strength of a concrete material in the single group of seismic-damping partition wall panels; $\mu_{2S}$ is a coefficient of friction between a top sliding driving point of the single group of seismic-damping partition wall panels and a horizontal force transmission member; $F_{Hu1}$ is a first friction damping force of the single group of seismic-damping partition wall panels; ω is an area reduction factor when the damage control check is performed on the concrete wall panels; $A_c$ is a projection area of the lower encased reinforcing boxes of the seismic-damping partition wall; $F_B$ is vertical compression of the elastic members against the single group of seismic-damping partition wall panels; and $G_w$ is a total gravity of the single group of seismic-damping partition wall panels.

9. The method for design of a seismic-damping partition wall with variable-friction energy dissipation according to claim 2, wherein a method for damage control check of the seismic-damping partition wall in step 7 is proposed on a premise that concrete in encased reinforcing boxes at corners of the seismic-damping partition wall is not broken prior to concrete outside the encased reinforcing boxes, and the method for check is:

$$\sigma_c \leq [\alpha f_c]$$

$$\sigma_c = \frac{\mu_{2S}F_{Hu1} + F_B + G_w}{\omega A_c}$$

where $\sigma_c$ is a compressive stress of concrete near the lower encased reinforcing boxes of the single group of seismic-damping partition wall panels; α is a safety factor when the damage control check is performed on the concrete wall panels; $f_c$ is an axial compressive strength of a concrete material in the single group of seismic-damping partition wall panels; $\mu_{2S}$ is a coefficient of friction between a top sliding driving point of the single group of seismic-damping partition wall panels and a horizontal force transmission member; $F_{Hu1}$ is a first friction damping force of the single group of seismic-damping partition wall panels; ω is an area reduction factor when the damage control check is performed on the concrete wall panels; $A_c$ is a projection area of the lower encased reinforcing boxes of the seismic-damping partition wall; $F_B$ is vertical compression of the elastic members against the single group of seismic-damping partition wall panels; and $G_w$ is a total gravity of the single group of seismic-damping partition wall panels.

10. The method for design of a seismic-damping partition wall with variable-friction energy dissipation according to claim 3, wherein a method for damage control check of the seismic-damping partition wall in step 7 is proposed on a premise that concrete in encased reinforcing boxes at corners of the seismic-damping partition wall is not broken prior to concrete outside the encased reinforcing boxes, and the method for check is:

$$\sigma_c \le [\alpha f_c]$$
$$\sigma_c = \frac{\mu_{2S} F_{Hu1} + F_B + G_w}{\omega A_c}$$

where $\sigma_c$ is a compressive stress of concrete near the lower encased reinforcing boxes of the single group of seismic-damping partition wall panels; $\alpha$ is a safety factor when the damage control check is performed on the concrete wall panels; $f_c$ is an axial compressive strength of a concrete material in the single group of seismic-damping partition wall panels; $\mu_{2S}$ is a coefficient of friction between a top sliding driving point of the single group of seismic-damping partition wall panels and a horizontal force transmission member; $F_{Hu1}$ is a first friction damping force of the single group of seismic-damping partition wall panels; $\omega$ is an area reduction factor when the damage control check is performed on the concrete wall panels; $A_c$ is a projection area of the lower encased reinforcing boxes of the seismic-damping partition wall; $F_B$ is vertical compression of the elastic members against the single group of seismic-damping partition wall panels; and $G_w$ is a total gravity of the single group of seismic-damping partition wall panels.

11. The method for design of a seismic-damping partition wall with variable-friction energy dissipation according to claim 4, wherein a method for damage control check of the seismic-damping partition wall in step 7 is proposed on a premise that concrete in encased reinforcing boxes at corners of the seismic-damping partition wall is not broken prior to concrete outside the encased reinforcing boxes, and the method for check is:

$$\sigma_c \le [\alpha f_c]$$
$$\sigma_c = \frac{\mu_{2S} F_{Hu1} + F_B + G_w}{\omega A_c}$$

where $\sigma_c$ is a compressive stress of concrete near the lower encased reinforcing boxes of the single group of seismic-damping partition wall panels; $\alpha$ is a safety factor when the damage control check is performed on the concrete wall panels; $f_c$ is an axial compressive strength of a concrete material in the single group of seismic-damping partition wall panels; $\mu_{2S}$ is a coefficient of friction between a top sliding driving point of the single group of seismic-damping partition wall panels and a horizontal force transmission member; $F_{Hu1}$ is a first friction damping force of the single group of seismic-damping partition wall panels; $\omega$ is an area reduction factor when the damage control check is performed on the concrete wall panels; $A_c$ is a projection area of the lower encased reinforcing boxes of the seismic-damping partition wall; $F_B$ is vertical compression of the elastic members against the single group of seismic-damping partition wall panels; and $G_w$ is a total gravity of the single group of seismic-damping partition wall panels.

12. The method for design of a seismic-damping partition wall with variable-friction energy dissipation according to claim 5, wherein a method for damage control check of the seismic-damping partition wall in step 7 is proposed on a premise that concrete in encased reinforcing boxes at corners of the seismic-damping partition wall is not broken prior to concrete outside the encased reinforcing boxes, and the method for check is:

$$\sigma_c \le [\alpha f_c]$$
$$\sigma_c = \frac{\mu_{2S} F_{Hu1} + F_B + G_w}{\omega A_c}$$

where $\sigma_c$ is a compressive stress of concrete near the lower encased reinforcing boxes of the single group of seismic-damping partition wall panels; $\alpha$ is a safety factor when the damage control check is performed on the concrete wall panels; $f_c$ is an axial compressive strength of a concrete material in the single group of seismic-damping partition wall panels; $\mu_{2S}$ is a coefficient of friction between a top sliding driving point of the single group of seismic-damping partition wall panels and a horizontal force transmission member; $F_{Hu1}$ is a first friction damping force of the single group of seismic-damping partition wall panels; $\omega$ is an area reduction factor when the damage control check is performed on the concrete wall panels; $A_c$ is a projection area of the lower encased reinforcing boxes of the seismic-damping partition wall; $F_B$ is vertical compression of the elastic members against the single group of seismic-damping partition wall panels; and $G_w$ is a total gravity of the single group of seismic-damping partition wall panels.

13. The method for design of a seismic-damping partition wall with variable-friction energy dissipation according to claim 6, wherein a method for damage control check of the seismic-damping partition wall in step 7 is proposed on a premise that concrete in encased reinforcing boxes at corners of the seismic-damping partition wall is not broken prior to concrete outside the encased reinforcing boxes, and the method for check is:

$$\sigma_c \le [\alpha f_c]$$
$$\sigma_c = \frac{\mu_{2S} F_{Hu1} + F_B + G_w}{\omega A_c}$$

where $\sigma_c$ is a compressive stress of concrete near the lower encased reinforcing boxes of the single group of seismic-damping partition wall panels; $\alpha$ is a safety factor when the damage control check is performed on the concrete wall panels; $f_c$ is an axial compressive strength of a concrete material in the single group of seismic-damping partition wall panels; $\mu_{2S}$ is a coefficient of friction between a top sliding driving point of the single group of seismic-damping partition wall panels and a horizontal force transmission member; $F_{Hu1}$ is a first friction damping force of the single group of seismic-damping partition wall panels; $\omega$ is an area reduction factor when the damage control check is performed on the concrete wall panels; $A_c$ is a projection area of the lower encased reinforcing boxes of the seismic-damping partition wall; $F_B$ is vertical compression of the elastic members against the single group of seismic-damping partition wall panels; and $G_w$ is a total gravity of the single group of seismic-damping partition wall panels.

14. The method for design of a seismic-damping partition wall with variable-friction energy dissipation according to claim 7, wherein a method for damage control check of the seismic-damping partition wall in step 7 is proposed on a premise that concrete in encased reinforcing boxes at corners of the seismic-damping partition wall is not broken prior to concrete outside the encased reinforcing boxes, and the method for check is:

$$\sigma_c \leq [\alpha f_c]$$

$$\sigma_c = \frac{\mu_{2S} F_{Hu1} + F_B + G_w}{\omega A_c}$$

where $\sigma_c$ is a compressive stress of concrete near the lower encased reinforcing boxes of the single group of seismic-damping partition wall panels; $\alpha$ is a safety factor when the damage control check is performed on the concrete wall panels; $f_c$ is an axial compressive strength of a concrete material in the single group of seismic-damping partition wall panels; $\mu_{2S}$ is a coefficient of friction between a top sliding driving point of the single group of seismic-damping partition wall panels and a horizontal force transmission member; $F_{Hu1}$ is a first friction damping force of the single group of seismic-damping partition wall panels; $\omega$ is an area reduction factor when the damage control check is performed on the concrete wall panels; $A_c$ is a projection area of the lower encased reinforcing boxes of the seismic-damping partition wall; $F_B$ is vertical compression of the elastic members against the single group of seismic-damping partition wall panels; and $G_w$ is a total gravity of the single group of seismic-damping partition wall panels.

* * * * *